US012104544B2

(12) United States Patent
Colborn

(10) Patent No.: US 12,104,544 B2
(45) Date of Patent: Oct. 1, 2024

(54) AIR-FUEL METERING FOR INTERNAL COMBUSTION RECIPROCATING ENGINES

(71) Applicant: Setaysha Technical Solutions LLC, Taylor Lake Village, TX (US)

(72) Inventor: John Craig Colborn, Taylor Lake Village, TX (US)

(73) Assignee: SETAYSHA TECHNICAL SOLUTIONS LLC, Magnolia, TX (US)

( * ) Notice: Subject to any disclaimer, the term of this patent is extended or adjusted under 35 U.S.C. 154(b) by 308 days.

(21) Appl. No.: 17/460,252

(22) Filed: Aug. 29, 2021

(65) Prior Publication Data
US 2021/0388778 A1 Dec. 16, 2021

Related U.S. Application Data

(63) Continuation of application No. 17/033,661, filed on Sep. 25, 2020, now Pat. No. 11,181,052.
(Continued)

(51) Int. Cl.
*F02D 19/00* (2006.01)
*F02D 19/02* (2006.01)
(Continued)

(52) U.S. Cl.
CPC ......... *F02D 19/023* (2013.01); *F02D 19/029* (2013.01); *F02D 41/0027* (2013.01);
(Continued)

(58) Field of Classification Search
CPC .. F02D 19/023; F02D 19/029; F02D 41/0027; F02D 41/1445; F02D 41/2454;
(Continued)

(56) References Cited

U.S. PATENT DOCUMENTS 3,567,135 A 3/1971 Gebert
4,625,690 A * 12/1986 Morita ................. F02P 5/1455
123/399
(Continued)

FOREIGN PATENT DOCUMENTS

CN 1219667 A 6/1999
EP 1116869 A2 7/2001
(Continued)

OTHER PUBLICATIONS

Stihl, found at: https://www.stihlusa.com/products/technology/stihl-m-tronic/, printed from internet Oct. 11, 2020.
(Continued)

*Primary Examiner* — Phutthiwat Wongwian
*Assistant Examiner* — Sherman D Manley
(74) *Attorney, Agent, or Firm* — Timothy L. Scott, Esq.

(57) ABSTRACT

A fuel metering system for an internal combustion engine having a fuel injection timing unit to indicate a timepoint during one or more engine strokes, a fuel metering element have a predetermined full stroke volume for metering fuel into an air-fuel mixing location during one or more of the engine strokes, and a fuel metering element controller to control the delivery of fuel by causing the fuel metering element to deliver one of a full stroke volume and a fraction of a full stroke volume to achieve a desired AFR. In some embodiments, power generator circuitry is provided to harvest power from the ICE to power at least one of the fuel injection timing unit, the fuel metering element, and the fuel metering controller.

24 Claims, 11 Drawing Sheets

Related U.S. Application Data

(60) Provisional application No. 62/906,701, filed on Sep. 26, 2019.

(51) Int. Cl.
| | | |
|---|---|---|
| *F02D 41/00* | (2006.01) | |
| *F02D 41/14* | (2006.01) | |
| *F02D 41/24* | (2006.01) | |
| *F02D 41/32* | (2006.01) | |
| *F02D 41/30* | (2006.01) | |

(52) U.S. Cl.
CPC ..... *F02D 41/1445* (2013.01); *F02D 41/2454* (2013.01); *F02D 41/32* (2013.01); *F02D 41/3082* (2013.01)

(58) Field of Classification Search
CPC .. F02D 41/32; F02D 41/3082; F02D 41/1497; F02D 41/1475; F02D 41/1486; F02D 41/0002; F02D 41/1406; F02D 2200/0625; F02D 2200/10; F02D 2200/101; F02D 31/002; F02D 31/007; F02D 11/106; Y02T 10/40
See application file for complete search history.

(56) References Cited

U.S. PATENT DOCUMENTS

| | | | | |
|---|---|---|---|---|
| 4,719,888 | A | | 1/1988 | Kobayashi et al. |
| 4,825,833 | A | * | 5/1989 | Ikeura ................ F02D 41/1443 123/336 |
| 4,846,119 | A | | 7/1989 | Geyer et al. |
| 4,932,370 | A | | 6/1990 | Schierling et al. |
| 5,027,773 | A | * | 7/1991 | Shimomura ............ F02D 41/32 123/492 |
| 5,067,460 | A | * | 11/1991 | Van Duyne ............ F02D 41/18 123/337 |
| 5,275,142 | A | | 1/1994 | Kapellen et al. |
| 5,558,062 | A | * | 9/1996 | De Minco ................ F02D 11/10 123/406.47 |
| 5,765,532 | A | | 6/1998 | Loye |
| 6,167,755 | B1 | * | 1/2001 | Damson ................ F02D 41/18 73/114.13 |
| 6,273,076 | B1 | | 8/2001 | Beck et al. |
| 6,354,268 | B1 | | 3/2002 | Beck et al. |
| 6,427,646 | B2 | | 8/2002 | Galka et al. |
| 7,809,495 | B2 | | 10/2010 | Leufen |
| 8,074,623 | B2 | * | 12/2011 | Carlsson ................ F02D 31/007 123/436 |
| 8,333,174 | B2 | * | 12/2012 | Carlsson ................ F02D 41/16 123/339.14 |
| 8,914,219 | B2 | * | 12/2014 | Neubauer ........... F02D 41/2451 123/436 |
| 9,115,670 | B2 | | 8/2015 | Yamashita et al. |
| 9,140,204 | B2 | * | 9/2015 | Gorenflo ............... F02D 35/025 |
| 9,500,170 | B2 | | 11/2016 | Nong |
| 9,765,724 | B2 | * | 9/2017 | Casoni .................. F02D 41/062 |
| 9,797,326 | B2 | | 10/2017 | Wixe et al. |
| 9,945,290 | B2 | | 4/2018 | Otsuji et al. |
| 10,415,496 | B2 | * | 9/2019 | Yamaguchi ........... F02D 31/007 |
| 10,495,017 | B2 | * | 12/2019 | Nonaka .................. F02M 19/04 |
| 11,181,052 | B2 | | 11/2021 | Colborn |
| 2003/0052763 | A1 | | 3/2003 | Padroni |
| 2011/0000462 | A1 | | 1/2011 | Ostojic et al. |
| 2014/0331970 | A1 | * | 11/2014 | Bidner .................... F02D 19/10 123/435 |
| 2015/0240735 | A1 | * | 8/2015 | Nakazono .......... F02M 63/0017 123/674 |
| 2017/0067400 | A1 | | 3/2017 | Sha |
| 2018/0030969 | A1 | | 2/2018 | Nong |
| 2018/0283332 | A1 | | 10/2018 | Nong |
| 2019/0120193 | A1 | * | 4/2019 | Burns ...................... F02M 7/18 |

FOREIGN PATENT DOCUMENTS

| | | |
|---|---|---|
| EP | 2270325 A2 | 1/2011 |
| EP | 2685074 B1 | 1/2014 |
| EP | 3179082 A3 | 11/2017 |
| EP | 3351782 A1 | 7/2018 |
| EP | 3412946 A1 | 12/2018 |
| JP | 2001020837 A | 1/2001 |
| WO | 2007133125 A2 | 11/2007 |
| WO | 2011154232 A1 | 12/2011 |
| WO | 2013105365 A1 | 7/2013 |
| WO | 2016069617 A1 | 5/2016 |
| WO | 2019104298 A1 | 5/2019 |
| WO | 2021062334 A1 | 4/2020 |

OTHER PUBLICATIONS

International Search Report and Written Opinion dated Dec. 16, 2020, International Application No. PCT/US2020/052963.

Shipe, Jacqueline, Cessna Flyer Association, "Understanding Your Lycoming Fuel Injection System", found at: https://www.cessnaflyer.org/maintenance-tech/item/1150-understanding-your-lycoming-fuel-injection-system.html printed from internet on Nov. 30, 2021.

"Rochester Ramjet", In Wikipedia, found at: https://en.m.wikipedia.org/wiki/Rochester_Ramjet; printed from internet on Nov. 30, 2021.

Notice of Allowance dated Aug. 30, 2021, U.S. Appl. No. 17/033,661, filed Sep. 25, 2020.

Office Action dated Feb. 22, 2021, U.S. Appl. No. 17/033,661, filed Sep. 25, 2020.

* cited by examiner

AIR-FUEL METERING FOR INTERNAL COMBUSTION RECIPROCATING ENGINES

CROSS-REFERENCE TO RELATED APPLICATIONS

This application is a continuation application of U.S. application Ser. No. 17/033,661, filed Sep. 25, 2020, which claims the priority benefit of U.S. Provisional Application Ser. No. 62/906,701, filed Sep. 26, 2019. This application claims the priority benefit of both of the foregoing applications, which are each hereby incorporated by reference in their entirety.

TECHNICAL FIELD

The present invention relates to the field of air and fuel metering at the induction (i.e., intake) of internal combustion engines. More particularly, it involves improved fuel metering systems and methods to ensure efficient metering, mixing, and combustion of fuel and air in internal combustion engines (ICEs).

BACKGROUND OF THE INVENTION

ICEs typically use a reciprocating piston in a combustion chamber where combustion of oxygen and fuel mixtures occurs. The expansion of gases during the combustion cycle is then used to drive the piston to convert the chemical energy of combustion into mechanical energy. Many technical tasks and subsystems are involved in the operation of ICEs. The present disclosure is concerned with the task of mixing of oxygen and fuel in the proper ratios or amounts to ensure controlled combustion to achieve one or more desired combustion goals (e.g., minimizing undesired pollution or inefficient combustion, maximizing power, or maximizing fuel efficiency).

Proper mixing of oxygen and fuel is a key technical requirement for internal combustion engines, regardless of the combustion goal. The speed, efficiency, and extent of combustion depends on mixing oxygen and fuel in the proper ratios. As used herein, references to air may be used instead of oxygen in the combustion process or combustion ratios, although it should be understood that the combustion process involves the reaction of only the oxygen in the air with the fuel. For consistency, references to ratios of fuel-air mixtures will be expressed as that of the air-to-fuel ratio (AFR). It will be understood, however, that persons of skill in the art may apply the teachings of the disclosure provided herein using the inverse relationship of the fuel-to-air ratio (FAR).

If the combustion mixture consists of too great a proportion of fuel relative to oxygen (also referred to as an "excess" or "rich" AFR or mixture), the combustion will be slow and/or incomplete, resulting in reduced power output, excess pollution, or both. The excess fuel does not fully combust inside the chamber, resulting in continued burning of the fuel in the exhaust process, resulting in waste heat that creates no engine power as well as increased emissions of unwanted solids (soot) and organic compounds. With an extreme excess of fuel in the air-fuel mixture, the engine will no longer support combustion and will cease to run. There are benefits of operating with a slight excess of fuel in the air-fuel mixture, however. Maximum power output is achieved with a slight excess of fuel, and results in overall lower engine temperatures, with the excess fuel serving to remove heat from the combustion process.

An excess of oxygen or air (also referred to as a "deficit" or a "lean" AFR or mixture) results in reduced power output. With an extreme deficit of fuel in the mixture, the ICE will no longer support combustion and will cease to run. However, as with excessive or rich AFRs, there are also benefits in running an ICE under a slight fuel deficit: emissions of exhaust gas pollutants are reduced because the fuel is completely consumed during the combustion step, with no fuel wasted in the form of unburned hydrocarbon gases or soot. Accordingly, maximum fuel efficiency is achieved when operating under a slight fuel deficit (i.e., a slightly lean AFR). However, as fuel deficits continue beyond the maximum efficiency point (i.e., as the AFR continues to increase), before the ICE ceases to run altogether it suffers negative effects of increased nitrogen-oxide pollutant emissions and poor running characteristics such as misfiring/stumbling, ultimately resulting in loss of combustion.

The conditions of an exactly correct fuel and oxygen mixture to result in chemically-balanced oxidation/combustion is referred to herein as a stoichiometric mixture. As previously stated, conditions of excess fuel in the mixture are referred-to as rich or excess mixtures or AFRs; and mixtures with a deficit of fuel in the mixture are referred-to as lean mixtures or AFRs. Rich mixtures may equivalently be referred to as those involving a high FAR or a low AFR. Similarly, lean mixtures are those involving a low FAR or a high AFR.

In one aspect, the present disclosure provides exemplary methods for the combustion of gasoline fuel when mixed with atmospheric air in ICEs. Given these two chemical inputs to cause a combustion reaction, there exists particular ratios of air and fuel which constitute rich, stoichiometric, or lean mixtures. The use of these particular inputs as examples for the purposes of describing and exemplifying the invention in the following descriptions are nonlimiting, and the methods disclosed herein may be used to enact different ratios should a different ratio be advantageous for use of different chemical fuels and oxidizers (e.g., fuels other than gasoline or other hydrocarbons, and oxidizing agents other than air such as pure oxygen).

SUMMARY

Figure 1:
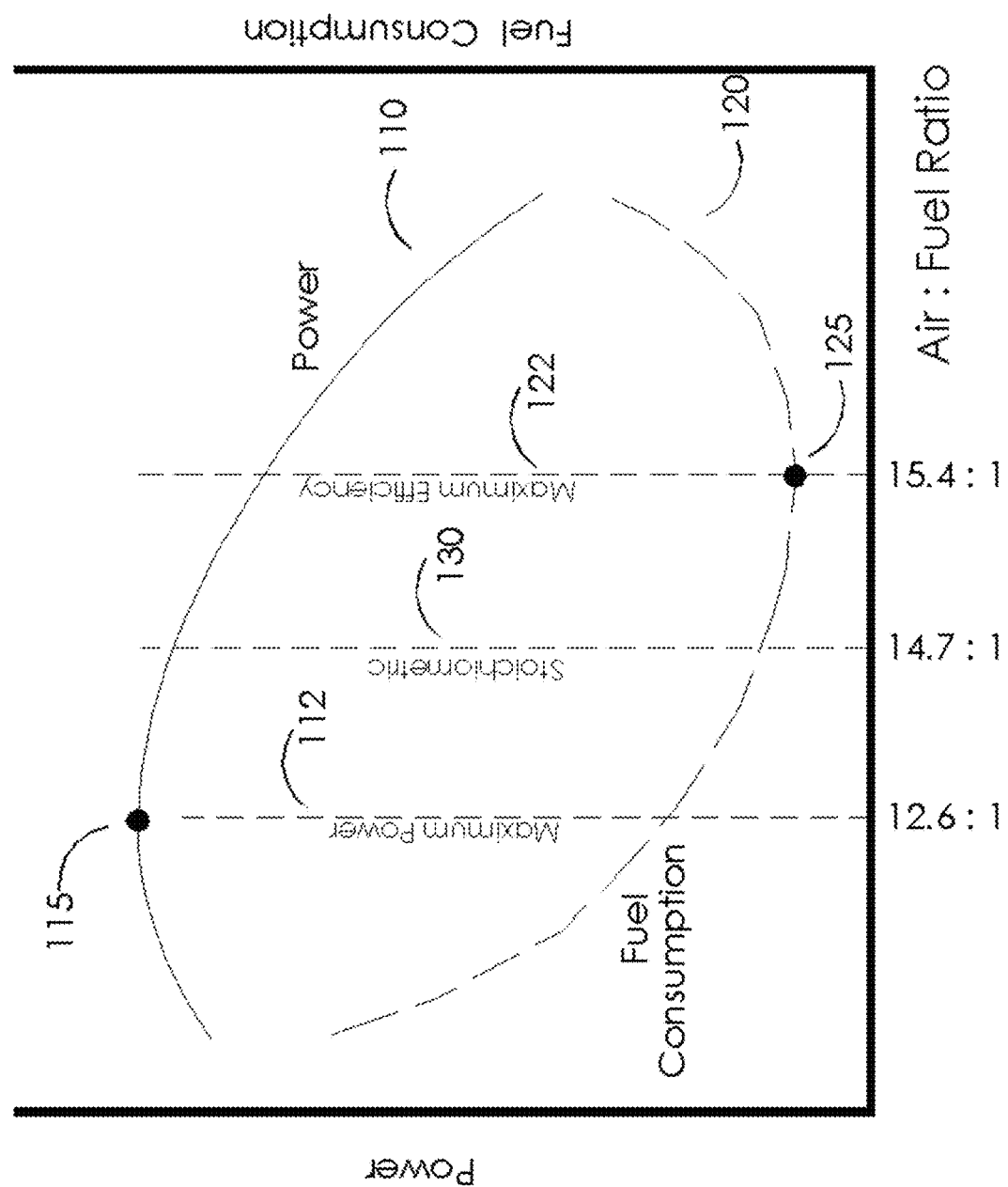
FIG. 1 is a graph showing power output and fuel efficiency for an internal combustion engine.

In one embodiment, the invention comprises a method of controlling the air-fuel ratio (AFR) of an operating internal combustion engine (ICE), the ICE having a combustion chamber, at least an intake stroke and a combustion stroke, a speed controller to adjust a throttle to maintain a target rotational speed, and an air intake determination unit to determine an air intake parameter indicative of the amount of air inducted into the combustion chamber during an intake stroke, the method comprising: a) determining a maximum-power AFR fiducial by 1) operating the ICE under a constant load at a first AFR defining one of a rich mixture and a lean mixture; 2) decreasing the AFR and determining a change in engine power output in response to the decrease in AFR; 3) if the engine power output increases in response to the decrease in AFR, repeating step a2 until the engine power output decreases in response to the decrease in AFR; 4) if the engine power decreases in response to the decrease in AFR in step a2, increasing the AFR and determining a change in engine power output in response to the increase in AFR; 5) if the engine power increases in response to the increase in AFR in step a4, repeating the step of increasing the AFR and determining a change in engine power output in response thereto until the engine power decreases in response to an increase in AFR; and 6) identifying the maximum-power AFR fiducial as the AFR at which any change in AFR results in a decrease in the power output of the engine; b) determining a maximum-efficiency AFR fiducial by 1) operating the ICE at a constant load at a second AFR, and determining the absolute amount of fuel injected for each air-fuel intake stroke; 2) increasing the AFR and determining a change in the absolute amount of fuel injected for each air-fuel intake stroke at the increased AFR; 3) if the absolute amount of fuel injected for each air-fuel intake stroke decreases in response to the increase in AFR, repeating step b2 until the absolute amount of fuel injected for each air-fuel intake stroke increases in response to the increase in AFR; 4) if the absolute amount of fuel injected for each air-fuel intake stroke increases in response to the increase in AFR in step b2, decreasing the AFR and determining a change in the absolute amount of fuel injected for each air-fuel intake stroke in response to the decrease in AFR; 5) if the absolute of amount of fuel injected for each air-fuel intake stroke decreases in response to the decrease in AFR in step b4, repeating the step of decreasing the AFR and determining a change in the absolute amount of fuel injected for each air-fuel intake stroke until the absolute amount of fuel injected for each air-fuel intake stroke increases in response to a decrease in AFR; and 6) identifying the maximum-efficiency AFR fiducial as the AFR at which any change in AFR results in an increase in the absolute amount of fuel injected; and c) operating the ICE at a desired AFR by controlling the amount of fuel delivered into the combustion chamber for each air-fuel intake stroke to achieve the desired AFR based on one of interpolation between the maximum-power AFR and the maximum-efficiency AFR, and extrapolation from one of the maximum-power AFR and the maximum-efficiency AFR.

In one embodiment, the invention comprises a method of controlling the air-fuel ratio (AFR) in an operating internal combustion engine (ICE), the ICE having a speed controller and an air intake determination unit to determine an air intake parameter indicative of the amount of air inducted into the ICE for each fuel-air intake stroke, the method comprising: a) characterizing at least a portion of the power performance of the ICE by 1) operating the ICE at a constant load at a first AFR; 2) performing a series of stepwise changes in the AFR and operating the ICE at a constant speed for a plurality of combustion cycles at each AFR setting in the series of stepwise AFR changes, wherein the series of AFR settings includes rich AFR values at which the ICE experiences poor engine performance, rich AFR values at which the ICE experiences good engine performance, and lean AFR values; 3) for each AFR setting in the series of AFR settings, determining a power output of the ICE at the AFR setting based on a power output determination for at least a subset of the plurality of fuel-air intake cycles at the AFR setting; b) determining at least one of a maximum-power AFR fiducial and a maximum-efficiency AFR fiducial; c) operating the ICE at a desired second AFR based on the maximum-power AFR fiducial and the power output of the ICE in the region of the desired second AFR.

Illustrative embodiments of the invention are described herein. In the interest of clarity, not all features of an actual implementation are described in this specification. In the development of any such actual embodiment, numerous implementation-specific decisions must be made to achieve the design-specific goals, which will vary from one implementation to another. It will be appreciated that such a development effort, while possibly complex and time-consuming, would nevertheless be a routine undertaking for persons of ordinary skill in the art having the benefit of this disclosure.

Certain terms are used throughout the following description and refer to particular system components. As one skilled in the art will appreciate, components may be referred to by different names. This document does not intend to distinguish between components that differ in name but not function.

FIG. 1 illustrates an exemplary graph of an ICE output power vs AFR curve 110 and a fuel efficiency vs AFR curve 120. Both curves 110, 120 demonstrate that inaccurate mixing (too much or too little fuel) results in rapid loss of both power and fuel economy. Beyond these operating zones, the engine ceases to run altogether. FIG. 1 is discussed in greater detail below.

The challenge of providing a burnable air-fuel mixture in an operating (i.e., running) ICE is complicated by the rate at which the induction or ignition process occurs, which is typically not less than 30 combustion events per second, and the fact that the amount of air and fuel induction may vary widely in successive individual combustion events depending on a number of factors including at least: instantaneous engine load; acceleration or deceleration requests (i.e., increasing or decreasing the throttle); varying environmental hindrances to air induction; varying propensity for the liquid fuel to vaporize based on factors such as fuel age, constituents, composition, or temperature; varying air constituents or composition influenced by temperature, humidity, air pollutants, and altitude; and varying engine induction performance based on wear, temperature, operating regime, and manufacturing variations.

The historic means of providing a burnable air-fuel mixture in an ICE is by the well-known means of a carburetor. Carburetors are mechanical systems having chambers and/or conduit structures for receiving air and fuel and mixing them so as to ensure a combustible mixture under most conditions. Carburetors provide a restriction structure in the airflow path which causes the induction air velocity to increase (thus decreasing the local pressure via the Bernoulli equations), and situating a fuel nozzle at the zone of lower pressures and higher velocity. Because of the decrease in air pressure at the restriction point in the air induction line, fuel (typically at a higher pressure) is pulsed into the induction air stream in proportion to the air velocity (which is used as a proxy for air volume or amount, thereby providing a basis for determining the AFR) entering the induction step. The pressure necessary to ensure that adequate fuel is delivered and mixed with the air is typically provided by gravity and atmospheric pressure, and the process is a continuous one that does not involve active measurement of the air and fuel delivered on a particular timescale or per combustion event to precisely control the AFR.

Carburetors are complex mechanical structures, requiring eloquent and high-tolerance manufacturing of multiple mechanical fluid circuits in metal housings. Maintaining physical geometries in the carburetor are paramount to attaining consistent, combustible air-fuel mixtures. Carburetors may contain dozens to hundreds of separate parts. The large number of components, material and process-tolerance requirements, as well as the multiple-steps necessary to construct mechanical fluid circuits in a physical housing result in high manufacturing costs. Moreover, the tight-tolerance physical structures and small orifices utilized cause carburetors to be prone to frequent fouling when contaminants are present. This can sometimes occur based on air contamination alone, but is more frequently the result of obstruction or blockage of the smaller mechanical fluid circuits when contaminants are present in liquid fuels. Worse, as fuel ages, the lower molecular weight components typically evaporate faster, causing the concentration of higher molecular-weight components in the fuel to increase. As this process continues, the fuel itself becomes more viscous and may transform into sludge or solids which clog the small mechanical fluid circuits, causing the carburetor to fail and the ICE to be inoperative. When the carburetor fails, because of its complexity and location deeply and tightly integrated into the ICE systems, repairs are often beyond the capability of most users, who must dispose of the ICE or pay costly service fees.

The fuel degradation process outlined above is accelerated by inherent design characteristics of carburetors, which require at least one—and usually two or more—openings to the atmospheric air. Since gasoline fuel vaporizes readily, these open channels to the air drive the foregoing fuel degradation process, resulting not only in fuel compromise but increased environmental pollution. As the higher molecular weight fuel constituents increase over time, the energy value per-unit volume of fuel also decreases. Because the carburetor meters fuel based solely on fuel volume and not based on its energy value, even if the carburetor provides combustible AFRs initially, it may become incapable of providing a combustible air-fuel mixture for aged fuels. Because of the complexity and design limitations inherent in carburetors, deterioration and damage may occur if the ICE and fuel sit unused for as little as a few months.

The open-air requirement of carburetors also creates a particularly dangerous failure mode. If a fuel-level valve within the carburetor (called a float valve) fails to close, the entire contents of the fuel tank will drain through the carburetor. This results in loss of fuel, damaging engine oil and/or the engine itself, and worst of all creating a fire hazard in the area around the spilled fuel. This failure occurs any time a particle contaminant or aged fuel prevents the fuel-level valve from closing. Because the float valve closing force is very small—usually less than 2 grams—the risk of improper valve closure in carburetors is relatively high.

Despite these drawbacks, carburetors remain in wide use because they do offer several benefits, which includes providing for air-fuel ratio control over a wide range of often rapidly changing ICE induction conditions. Another major benefit of carburetors is their ability to provide for air-fuel ratio control without any auxiliary power requirement. Thus, ICEs which utilize carburetors need not include external power or batteries, and also avoid the need for associated battery charging systems or voltage control subsystems.

The inherent limitations of carburetors spurred the development of alternatives for carburetors throughout the 1960s-1980s. Beginning with mechanical fuel injection, systems were developed which delivered fuel during induction to more precisely match air intake. This evolved to become electronically-controlled fuel injection which completely supplanted carburetors in American automobiles by the 1990s and remains the standard for automobiles today.

Electronic fuel injection (EFI) overcomes most of the weaknesses of carburetors, but with the detriment of increased system complexity and significantly increased cost. Notably, one aspect of complexity and cost associated with EFI is the need to provide electrical energy to the system before the ICE is running. Thus, to employ EFI with an ICE, the product utilizing the ICE (e.g., automobile, ATV, lawnmower, etc.) must also employ a power source or battery, as well as charging and voltage regulation subsystems.

Figure 2:
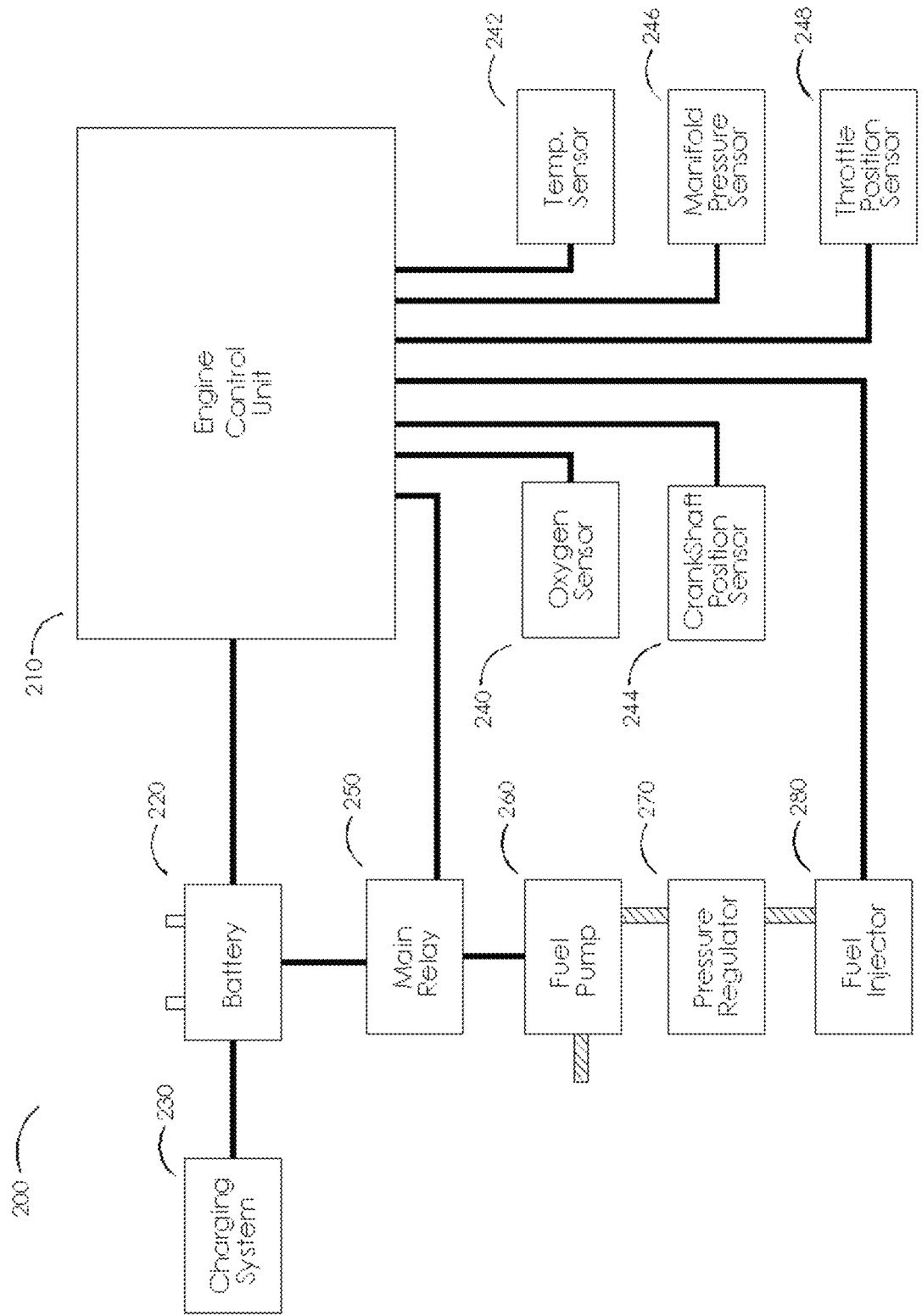
FIG. 2 is a functional system diagram illustrating aspects of prior art electronic fuel injection systems.

FIG. 2 presents an exemplary diagram of the electrical system components of a motorcycle employing EFI and illustrates the complexity of the components, wiring, and interactions that EFI systems employ in replacing a carburetor. The engine control unit (ECU) 210 is the computerized subsystem element which monitors all the sensors, applies logic, and commands a dose of fuel delivery for each engine cycle.

EFI systems are typically designed as either open-loop or closed-loop systems. In open-loop EFI systems, a processor or computer searches a pre-programmed look-up-table for values which match the instantaneous sensor measurements in the ICE and delivers a fuel dose that is pre-determined at the manufacturer and which should work well for the detected conditions.

An example of a closed-loop EFI system 200 according to the prior art is shown in FIG. 2. In closed-loop EFI systems 200, one or more exhaust gas sensors are often used to determine the AFR of the combustion event that created the exhaust gas. Sensor measurements in EFI systems 200 can include a variety of sensing elements used by an ECU 210 to control the metering of fuel by a fuel pump 260 to the ICE. In the example of FIG. 2, the sensors include an oxygen sensor 240 and a temperature sensor 242, which monitor the oxygen concentration and temperature, respectively, of the ICE exhaust gases. Additional sensors shown in the example of FIG. 2 include a crankshaft position sensor 244 to enable the ECU to determine the timing of fuel metering events, a manifold pressure sensor 246 which is used in calculations of how much fuel is metered into a cylinder during an intake stroke, and a throttle position sensor 248 used to deduce how much air is inducted into a cylinder during intake strokes. It will be appreciated that other or additional sensors may be used in different prior art implementations. The electrical components in the embodiment of FIG. 2 also include a battery 220 to provide electrical power to the EFI system 200, and a battery charging system 230. Other components such as main relay 250 may also be used to provide electrical power to various components of the EFI system 200. A fuel pump 260, pressure regulator 270, and a fuel injector 280 are the primary mechanical elements controlled by the ECU 200 to deliver (or "meter") fuel to create an air-fuel mixture for combustion in the cylinders of the ICE.

In the example of FIG. 2, an oxygen sensor 240 and a temperature sensor 242 may be positioned in the ICE's exhaust gas flow to sense the oxygen concentration and temperature of the exhaust gases. The signal from the oxygen sensor is processed by the ECU 210 to determine the pre-combustion AFR based on the detected $O_2$ concentration and temperature of the exhaust gas. In other words, the oxygen and/or temperature sensors 240, 242 indicate—after the fact—the AFR of the combustion event that created that exhaust gas, and in particular whether the combustion event was a rich, stoichiometric, or lean air-fuel mixture. EFI systems 200 which employ oxygen and/or temperature sensors 240, 242 operate as a closed loop to adjust the AFR based on the actual chemical combustion performance of the ICE, and not just on the set of conditions measured by other sensors which should predict or correlate to combustion performance.

EFI is not used on all internal combustion engines. While EFI systems offer improved ICE performance relative to carburetors, their increased complexity and cost prohibit their use in many applications, most notably small engines. Presently, EFI is primarily employed in automotive products where the cost of the EFI system represents a small portion of the total product cost. At present, the simplest products which pervasively employ EFI are high-end motorcycles. These employ the simplest implementation of EFI, yet still impose significantly higher cost and complexity than carburetors. On a motorcycle, the EFI subsystem cost is a higher proportion of total product cost than with automobiles, but the benefits of EFI may make the costs and benefits to the consumer justifiable. Some high-end off-road vehicles are beginning to offer EFI. Small Off-Road Engines (SORE) such as used with lawnmowers, pumps, pressure-washers, generators and including handheld devices incorporating internal combustion engines such as blowers, weed trimmers, & chainsaws rarely, if ever, are offered with EFI. In most cases the threshold for EFI utilization is 10% of overall product cost or less. For many SOREs EFI would require increasing the price of the product by 60% or more, which precludes their use except in rare cases.

In order for a product to switch from using a carburetor to EFI, in general the EFI implementation either must not increase total product price by more than about 10%, or must be required by external factors such as government-imposed environmental, pollution control, and/or safety regulations. The inherent architecture of existing EFI systems involve complex and rapid timing events (e.g., metering multiple small fuel doses on timescales of microseconds via components operating at elevated pressures of 2-4 atm). One object of the present invention is to provide fuel metering systems capable of providing reliable fuel delivery in internal combustion engines over a wide range of operating conditions that are simpler and less expensive than existing EFI systems, and which are less mechanically complex and more reliable than carburetors.

DETAILED DESCRIPTION

In one aspect, the invention aims to provide for all the benefits of EFI, but at system costs no more than—and preferably less than—products using carburetors for fuel metering. In one embodiment, the invention provides a system for metering air and fuel that uses software to implement the functions of at least some mechanical elements found in carburetors. In one embodiment, systems of the present invention employ new engine state measurement metrics as logical inputs to a logic unit operating (e.g., as software and/or firmware) in a processor such as a microprocessor or field programmable gate array (FPGA). Systems and methods of the present disclosure are lower in cost, simpler to physically configure, and more accurate and reliable than mechanical carburetors.

In one embodiment, the invention combines the elements of fuel pump and injector into a single subsystem which can operate at reduced pressures compared to existing EFI systems, providing for AFR management with significantly reduced electrical power requirements, fewer system components, and reduced physical complexity.

In one embodiment, the invention provides an actively-managed fuel and air delivery system that is operable without the need for a power, battery, or battery charging subsystem. To further obviate the need for these expensive electrical power subsystems, in one embodiment the invention uses passively-actuated fuel delivery until the ICE is running, and energy harvested from the ICE thereafter powers the electrical logic unit/ECU. This results in improved fuel metering vs carburetors, at similar if not lower costs.

The invention's mechanical configurations/geometries allow for reduced mechanical complexities and wide tolerances of physical features which allow for low-cost manufacturing methods and achieving precision using software controls compared to the extremely precise tolerances required for the manufacture of carburetors and conventional EFI systems.

Because systems of the present disclosure involve reduced mechanical complexity, servicing the air-fuel metering system is also simplified, reducing the need for expensive maintenance.

In one embodiment, a physical housing in the general shape of a carburetor body is provided to easily integrate with existing ICE induction, airflow, and throttle valve controls; including fuel hose entrance, air filtering structures, and throttle linkages. In an alternate configuration, a fuel metering element (FME) comprising a Micro-metering Low-pressure Pump (MLP) is placed within the fuel tank or attached to the fuel filler lid, or exists in-line with existing fuel tubing to ease integration and improve accessibility compared to existing carburetor-based ICEs.

In one embodiment, the system uses a throttle induction airflow valve in the same way as existing carburetor or EFI systems, so that external, existing systems or components control the throttle position—including speed-governed throttle controls. Although it is preferred for cost reasons to utilize existing throttling airflow controls, in alternative embodiments the invention may also provide new controls for or detections of the positioning of the throttle valve without undue experimentation.

Figure 3:
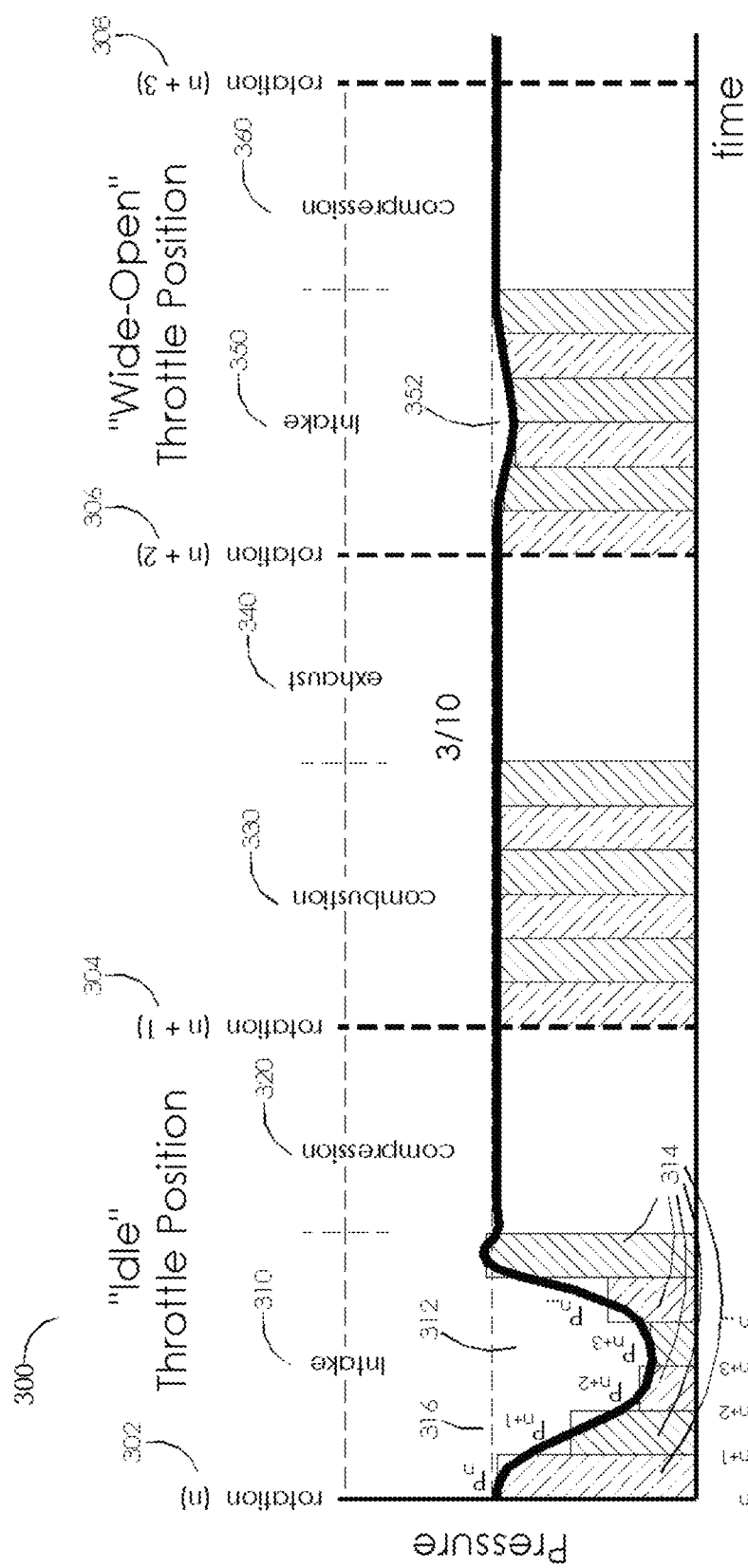
FIG. 3 is an illustrative representation of one embodiment of a method to determine the amount of air inducted into a combustion chamber of a cylinder of an internal combustion engine.

FIG. 3 illustrates a functional representation of a method to determine the amount of air entering the engine's cylinder(s) using a plurality of time-variant pressure measurements made in an air induction conduit during an intake stroke in one embodiment of the present invention. FIG. 3 provides a representation of pressure (Y-axis) vs time (X-axis), with time proceeding to the right. ICEs follow a repeating cycle. FIG. 3 represents an exemplary four-stroke-cycle internal combustion engine ('Four-stroke') for the sake of illustration, although the method may also be used with two-stroke-cycle engines without undue experimentation by a person of skill in the art having the benefit of the present disclosure. In a four-stroke engine, the first rotation portion, n, illustrates pressure changes in an air induction conduit during an intake stroke during the first half of the first rotation portion, and a compression stroke during the second half of the first rotation portion n. On the next rotation portion, n+1, a combustion stroke occurs during the first half of that rotation portion, and exhaust occurs during the second half. The process repeats beginning at rotation portion n+2.

The vertical axis of FIG. 3 illustrates an exemplary pressure scale. An absolute pressure scale is the embodiment illustrated here, although relative pressures may also be used in some embodiments. The ICE pressure in the air intake conduit is initially at an environment of 1 atmosphere (ATM) pressure, although the method works and in fact adapts to varying local pressures such as high-altitude locations where the local environmental pressure would initially be at some pressure less than 1 ATM.

During the 'intake' phase, induction gases (e.g., air) flow in toward the combustion chamber of the cylinder. This inflow occurs at high velocity and within the engine's intake passageway/conduit. In some embodiments (see FIG. 5), a throttling valve (throttle) may be positioned within the intake conduit so that induction air may be regulated (i.e., limited or unrestricted as needed) to control the amount of power the engine creates at any given time. In small off-road engines (SORE), the throttle is most often controlled by the user or an external governor. Consequently, the throttle (i.e., power demand) varies independently of the air/fuel mixing system, and the mixing system must respond to the varying throttle conditions.

FIG. 3 illustrates pressure changes occurring in an air induction conduit having an engineered or inherent restriction to determine pressure changes during a plurality of engine rotations of an ICE. These pressure changes are used to determine the amount of air inducted into a combustion chamber of a cylinder according to an embodiment of the invention. More particularly, the figure provides a graph 300 of pressure changes (Y-axis) over time (X-axis) during a plurality of engine rotations 302, 304, 306, 308. Although graph 300 depicts absolute pressure over time, it will be appreciated in view of the present disclosure that similar graphs may be prepared to depict differential pressure changes in the air induction conduit over time, and that the invention may be practiced using either absolute or differential pressure measurements.

The graph begins at time to at the beginning of an intake stroke 310, which together with compression stroke 320 occur during an exemplary engine rotation n (302). A conventional flow restriction structure (e.g., throttle flapper) provided in the induction conduit causes a pressure reduction 312 across the flow restriction during an intake stroke 310. At a plurality of timepoints ($t_{n+1}$, $t_{n+2}$, $t_{n+3}$, etc.), the pressure in the induction conduit on the downstream side of the orifice is determined. FIG. 3 illustrates a method to determine a representative measure of the area under the pressure-time curve accomplished by summing or integrating the values of pressure vs. time, as illustrated by the shaded regions 314, which here illustrate the mathematical product of pressure and the duration of each time period. For example, pressure $P_n$ is taken as representative of the absolute pressure for the time period between the beginning of the intake stroke at to and the pressure at timepoint $t_{n+1}$. Similarly, the pressure $P_{n+1}$ is taken to represent the absolute pressure of the time period between timepoints $t_{n+1}$ and $t_{n+2}$. Similar pressure values are likewise calculated for each of the remaining periods comprising the intake stroke, and the values of these are mathematically integrated in order to arrive at a mathematical value indicative of the area under the pressure-time curve for at least a portion of the intake strokes. It will be appreciated that some amount of imprecision is introduced at low sampling speeds, and these are improved with higher sampling speeds. It has been demonstrated that sampling every 200 microseconds is sufficient to achieve accurate air volume determinations at 7000 rpm, and this sampling rate is easily accomplished by the most affordable microcontrollers. It will be appreciated that the absolute meaning of the resulting accumulated value need not be tied to existing units of measure, but that the resulting mathematical value is a representative value which is reliably changing and correlates to the volume of air inducted to the engine during an intake stroke, and which may be used to determine the proper amount of fuel to be metered for a particular ICE in which a system according to the present invention is implemented. It will be apparent to a person skilled in the art that multiple means of mathematically correlating the air intake volume given the pressure sensor data over time are possible, and the methodology described here is to be considered nonlimiting.

The difference between the pressure at the start of the intake stroke, illustrated by dotted line 316, and each of the sampled pressures (Pn, Pn+1, Pn+2, Pn+3, etc.) for the time periods comprising the intake stroke 310 may be summed or integrated to provide a measure of the air inducted into the combustion chamber during the intake stroke 310. This summed parameter may be calculated by a processor, and is referred to herein as an induction change in pressure integration (IdPI) value. As will be appreciated, the greater the number of periods into which the intake stroke is divided, the greater will be the accuracy of the calculated IdPI value for a given intake stroke (e.g., 310, 350). After the intake stroke 310 is complete, there is no air flowing into the cylinder combustion chamber during the following compression (320), combustion (330), and exhaust (340) cycles, so the pressure for those strokes is the same as that at the start and end of the intake stroke 310, as illustrated by the solid pressure line in FIG. 3.

Intake stroke 310 is illustrative of an intake stroke for which intake throttle valve highly restricts air flow into the induction conduit, for example, when the ICE is on idle and takes in very little air. For this reason, the decrease in pressure is relatively high once air begins to flow in the induction conduit, as indicated by the depth of the pressure decrease 312. In contrast, intake stroke 350 occurring during a wide-open throttle, has a comparatively small pressure decrease 352, because the throttle provides relatively little restriction to the flow of air into the combustion chamber of the cylinder. FIG. 3 further illustrates a second compression stroke 360 following intake stroke 350. Compression stroke 360 is similar to compression stroke 320 previously discussed.

In one embodiment the method of determining air induction into a cylinder may be implemented by an Induction Change in Pressure Integration (IdPI) unit provided as part of an air induction determination unit (AIDU). The AIDU may include a pressure sensor to sense absolute or differential pressure during an intake stroke. The pressure sensor may sense pressure continuously or at a desired sampling rate (e.g., at a desired sampling rate of 100-1,000,000 times per second or more). The IdPI unit preferably either receives pressure signals at a desired rate from the pressure sensor, or samples a continuous signal from the pressure sensor at the desired sampling rate, and then calculates an IdPI value as described in connection with FIG. 3 that is indicative of the amount of air inducted into the cylinder combustion chamber during the intake stroke.

The IdPI unit may be implemented as a logic unit within the AIDU, and may comprise a non-transitory computer readable medium storing code for execution by a processor to receive and process the pressure changes and calculate air inducted. In one embodiment, the IdPI unit measures pressure changes during each intake stroke in an induction conduit at a location between an intake valve of a cylinder combustion chamber and the throttle induction airflow valve. The IdPI unit provides a signal indicative of the mathematical area under the curve of pressure over time, measured for each air intake stroke. The integrated area under the pressure curve for each stroke changes in proportion to the amount of air which entered the ICE on each stroke. A mathematical relationship between the IdPI value and the amount of air which entered the ICE is used to determine the amount of fuel which must be delivered in order to achieve the target air-to-fuel ratio (AFR).

In some embodiments, the pressure signal and/or the IdPI value in the time domain may be utilized to determine which engine rotation (or portion of a rotation) corresponds to an intake stroke, and to derive timing of engine events such as shaft rotation and rpm. In alternative embodiments, existing ICE electronic signals from, e.g., a camshaft position sensor, a crankshaft position sensor, an engine output shaft position sensor, or other timing signals indicative of engine timing events may be used to determine when an intake stroke occurs (e.g., by identifying one or more timepoints at the start, induction phase, and/or end of an intake stroke). In some embodiments, with knowledge of the IdPI values and ICE rpm, the load (i.e., the amount of work that the engine is performing) may be derived without the need for sensors coupled to the engine's output or on the engine's exhaust.

When the throttle valve is almost completely closed, commonly referred to as "idle," the engine is only producing enough power to maintain its commanded idle speed. The throttling valve prevents almost all air from entering the combustion chamber, and very little chemical and mechanical energy is produced. The challenge for the air/fuel metering system is to deliver an amount of fuel in proper proportion to the amount of air (more specifically oxygen) that entered the cylinder via the intake conduit to achieve a target AFR. FIG. 3 illustrates a method of determining the amount of air entering into the combustion chamber according to one embodiment of the present invention.

The method may be performed by an air induction determination unit (AIDU) comprising a processor having a logic unit capable of processing pressure signals from a pressure sensor in the air intake conduit a plurality of times during an intake stroke (e.g., intake stroke 310). Thus, the AIDU has the ability to track time and to measure pressure. In particular, an induction change in pressure integration (IdPI) unit repeatedly determines pressure at various timepoints during an induction stroke, and computes an area under the time-variant curve of pressure. In a preferred embodiment, the IdPI unit determines pressure as many times as practicable, and only during the intake stroke portion of the cycle, although in alternative embodiments the area may be calculated using any number of intervals and also by calculating area under additional portions of the engine cycles (e.g., the area under the curve for an entire engine rotation, whereas the intake stroke only applies for a half-rotation) so long as the computed value may be related mathematically to the amount of air ingested during intake strokes.

As illustrated, intake strokes (310) for the idle condition—or throttling valve mostly-closed condition—results in less accumulated area (shaded area) under the pressure-time curve than the accumulated area under the condition of 'Wide-Open/Max-Power Throttle Position' (WOT) 350. Because there is very little airflow restriction being enacted by the throttling valve during the n+2 (WOT) rotation, the pressure at the engine's intake remains at, or very close to, atmospheric pressure. It will be understood that the pressure inside the induction conduit remains at the local atmospheric pressure for all but the intake stroke, regardless of the position of the throttling valve. This is because the air intake valve (523, FIG. 5) remains closed except during intake strokes, thereby preventing air flow in the induction conduit and into the cylinder during all other strokes (e.g., compression, combustion, exhaust). In the absence of air flow across the throttling valve, the pressure on either side of the throttling valve remains at the local environmental pressure. The IdPI unit and method of finding the area under the pressure-time curve is referred-to herein as Induction Change in Pressure Integration (IdPI), denoting the method of integrating (I) the changes of pressure (dP) over time within the engine's induction (I) circuit.

The IdPI metric is influenced by the rate at which air is entering the engine. To illustrate: in the case that the throttling valve is almost closed, when the engine's piston is causing the rate of filling the chamber to be very fast (e.g., when engine RPM is high), the IdPI sensor will experience the maximum pressure drop ($P_{n+3}$ in FIG. 1) and consequently the total volume of air which resultantly gets into the combustion chamber will be limited. Conversely for the same almost-closed throttling valve setting, if the engine RPM is low and thus air is barely flowing, the pressure measured by the IdPI sensor would be practically indistinguishable from the surrounding atmospheric pressure and yet the total volume of air which resultantly gets into the combustion chamber will be maximal. Thus, in order to ultimately deduce the amount of air which entered the combustion chamber for the purposes of prescribing a corresponding dose of fuel, in one embodiment the IdPI unit applies a transform metric using the IdPI value and a velocity metric (e.g. RPM) to determine the volume of air that entered the chamber using a pre-determined relationship. In a preferred embodiment, a mathematical equation defining the IdPI value vs necessary fuel dose is defined for a given engine rpm, and the variables (such as offsets and slopes) are adjusted based on the engine RMP. In alternative embodiments, look-up tables (e.g. fuel MAPs known in the art) may be used in lieu of complex, multi-variable mathematical equations.

Various methods to integrate the pressure-time curve will be apparent to persons of skill in the art having the benefit of the present disclosure, and the example given in FIG. 1 is to be considered nonlimiting.

In one aspect, the invention comprises a fuel metering element (FME) such as a micro-metering low-pressure pump (MLP) whose volumetric output can be controlled using a low-power, switchable signal. In a preferred embodiment, the FME is a diaphragm MLP pump actuated linearly. In a particular embodiment, the linear activation in a first (e.g., forward) direction is achieved via an electromagnetic pulse signal. The electrical pulse width and/or amplitude of such electromagnetic pulse signals are signals easily controlled by low-cost logic controllers. The linear activation in the other (e.g., second or reverse) direction of the fuel-pumping stroke may be achieved via passive means (e.g., spring return) or by actively reversing the direction of the electromagnetic pulse using a low-cost fuel metering element controller (e.g., a microprocessor or field programmable gate array (FPGA)).

In one embodiment, an electromagnetic pulse signal may activate the FME to cause it to deliver either a full stroke volume of fuel or any desired partial stroke volume of fuel. A FME controller may be provided to control one or both of the duration and amplitude of the electromagnetic pulse signal to the FME. If the FME controller allows the full electromagnetic pulse to actuate the FME, a full stroke volume of fuel is provided, which in a particular embodiment is a volume of fuel sufficient to provide a rich, combustible volume of fuel under startup conditions. The FME controller may include circuitry to switch off the electromagnetic pulse at any point during the delivery of a stroke volume of fuel so as to achieve any desired portion of a partial stroke volume (e.g., any value from 0-100% of the full stroke volume). The FME controller may either reverse the polarity of the signal and cause the pump to move in the opposite direction, or may simply shunt the power and allow a biasing element to return the pump to the initial position prior to the next intake stroke.

With knowledge of the air inducted during each intake stroke (e.g., using an air induction determination unit having an IdPI unit), and the ability to control the metering of fuel, systems of the present invention may control the fuel metering to achieve a desired goal or target AFR. In one embodiment, a fuel injection timing unit detects (or otherwise identifies) the occurrence and timing of an induction stroke, and provides a timing signal to the FME controller, which may provide a desired amount of fuel to achieve a target AFR based on the magnitude of the air inducted into the cylinder during one or more immediately preceding intake strokes.

Because the air induction and fuel metering steps for a single combustion event occur simultaneously (i.e., during a single intake stroke), it is impossible to use the air induction for a single combustion cycle, calculated using the IdPI as discussed above, as the basis for calculating and delivering a desired amount of fuel for the same combustion event/intake stroke. However, under steady-state conditions at constant load, or under any condition of rapidly repeating combustion cycles, the rate of change for any throttle differences is comparatively very slow. Accordingly, the amount of air induction for successive intake strokes is practically unchanged from one stroke to the next, so that the air induction for a first intake stroke of a given cylinder can be used to determine and deliver the amount of fuel to be delivered in a second, immediately succeeding intake stroke for that cylinder. Accordingly, in one embodiment the amount of air inducted for a first intake stroke is calculated by the IdPI unit within the AIDU and used to determine and control the amount of fuel to be injected for the next (i.e., immediately succeeding) combustion cycle for a particular cylinder. It will be noted that such calculations may be performed separately to control the amount of fuel in each of a plurality of cylinders (e.g., eight such calculations for an eight-cylinder engine).

In another embodiment, a measure of central tendency of the air inducted for a series of intake strokes for a particular cylinder (e.g., a single cylinder of a single-cylinder ICE or a specific cylinder of a multi-cylinder engine) is calculated by the AIDU and IdPI units and used to determine the amount of fuel to be delivered to the combustion chamber in a succeeding intake stroke. For example, in one embodiment a moving average of the air inducted into a cylinder in a series of 10 intake strokes may be used to determine the amount of fuel to be delivered in an $11^{th}$ intake stroke immediately following the 10 intake strokes used to calculate the moving average. The use of measures of central tendency may provide for more consistent delivery of fuel by smoothing the data for the calculated air induction amounts. It will be apparent that moving averages using different numbers of strokes (e.g., 2, 3, 5, 7, 15, 20, 100, etc.) may be used instead of 10. In alternative embodiments, different measures of central tendency (e.g., a median value, or a percentile value of all of the calculated values of air induction for the plurality of intake strokes, e.g., the $40^{th}$ percentile, the $75^{th}$ percentile, etc.) of the air inducted for any desired number of intake strokes may be calculated and used to determine and control the amount of fuel to be delivered in a succeeding (e.g., the next) intake stroke to achieve a desired AFR.

In one embodiment, the desired amount of fuel is a stoichiometric amount of fuel (i.e., an amount of fuel to achieve an AFR of 14.7) is delivered, based on an amount of air inducted for one or more preceding events as calculated by the IdPI. In another embodiment, the desired amount of fuel is a rich mixture (i.e., greater than a stoichiometric amount of fuel, e.g., sufficient to achieve an AFR of less than 14.7, such as 12.6, which is the maximum power AFR). In a still further embodiment, the desired amount of fuel is a lean mixture (i.e., less than a stoichiometric amount of fuel, e.g., an AFR greater than 14.7, such as 15.0). In various embodiments, the desired amount of fuel may be selected by a user, or algorithms may be provided in one or more controllers to cause the fuel metering system switch between a stoichiometric mixture, a rich mixture, and a lean mixture based on programmed parameters such as acceleration or deceleration requests, load, atmospheric temperature or pressure, humidity, engine temperature, running time, or based upon inputs received from system monitoring sensors.

In a preferred embodiment, the FME actuation pulse for delivering fuel to the combustion chamber for a particular intake stroke is supplied by the act of a permanent magnet associated with the engine's flywheel moving quickly past an electromagnetic-generator pickup coil, as explained in greater detail below in connection with FIG. 5. This configuration already exists in small off-road and handheld engines as the manner that the electrical spark is generated. In one embodiment, the magnet moves past a pickup coil (e.g., the spark system's existing pickup coil) and generates an electrical pulse which drives the FME and causes a squirt of fuel of a desired amount to be delivered upon the very first engine rotations, and even before the logic controller is powered and has a chance to boot its operating software. Because startup rotation behavior can be accurately characterized for any given ICE, fuel metering systems of the present invention may be sized to passively harvest energy from the flywheel (or other passive sources such as pneumatic or mechanical events within the ICE) and cause the FME to deliver a rich, combustible AFR mixture to the cylinder during each startup intake stroke. In one embodiment, the permanent magnet, pickup coil, and MLP are sized in consideration of each other such that a wholly passive pulse results in a squirt of fuel equating to the most fuel-rich fuel-dose-per-stroke of all operating regimes (e.g., the richest mixture at which the engine is capable of operating, which generally occurs during startup). In this way, the engine may be dosed with fuel sufficient for reliably starting and running, albeit without using the IdPI and associated logic to actively determine the amount of air inducted and the amount of fuel to achieve a desired AFR during start-up.

In one embodiment, after a specified number of rotations (e.g., about 4 rotations), enough electrical charge will have been harvested and enough time elapsed to allow controllers and/or processors in the system to assert active AFR metering. In particular, when the FME controller is operating, it may use the IdPI to determine of the amount of air inducted in one or more intake cycles to determine the amount of fuel needed for subsequent pulses to achieve a desired AFR. This may involve actively shunting a portion of the passively-generated activation pulse in order to cause the MLP to provide less than a full stroke volume fuel (which as noted may be a rich mixture of fuel) to affect a leaner mixture. The timing at which the shunting signal is sent may also be controlled for each engine intake stroke to achieve a desired AFR (e.g., a stoichiometric mixture).

In one embodiment, the system includes energy storage elements (e.g., one or more capacitors) to store energy from the pickup coils and then use this stored energy to drive processors and logic unit controlling the FME (e.g., a MLP or controllable valve) to meter fuel for each intake stroke. In alternative embodiments, batteries and charging systems or other power supplies may be provided.

Once the ICE has been started and energy from the spinning engine sufficient to boot and power the logic controller has been harvested, a logic unit (e.g., implemented as part of a fuel metering element (FME) controller), may then cause the engine to produce warm-up and acceleration enrichment AFR levels according to methods known in the art prior to performing AFR control methods of the present invention.

In one embodiment, an FME controller monitors engine conditions for indicators of a steady state and a stable load. These may be provided by torque sensors, monitoring output of the associated equipment (such as electrical output of generators), monitoring the fuel delivery output, monitoring IdPI in a preferred embodiment, measuring the stroke-to-stroke time difference of intake and power strokes, etc. In some embodiments, existing electrical signals available from controllers already present in the ICE may be used by the FME controller to determine when the engine is operating at a steady state and a stable load.

A four-stroke-cycle engine performs one rotation portion consisting of an intake/induction half followed by a compression second half; and a second rotation portion consisting of an explosion/combustion first half followed by an exhaust second half, as previously described in the discussion of FIG. 3. In this description, the ICE movement during the first rotation portion is provided by the momentum stored in the moving components. In the second rotation portion, the engine movement accelerates during the explosion half-stroke and decelerates during the exhaust half-stroke. If an ICE is subject to a LOW level of constant load, then the first rotation portion will show a low magnitude of slow-down/deceleration which occurred due to energy losses in the engine and the work being done externally by the engine. Conversely, if the ICE is subject to a HIGH level of constant load, then the first stroke will show a higher magnitude of slow-down/deceleration due to the external work that was done while the engine stroke was only coasting.

In order for the ICE to maintain an overall average speed, the amount of slow-down which occurs during the coasting/slowing phases of the engine cycles must be matched with acceleration/speed-up caused by the combustion cycle. These may be detected with a single monitoring position with a four-stroke-cycle engine, but must include two or more monitoring positions with a two-stroke-cycle engine. With the ability to measure timing of each rotation of the two-rotation engine cycle (e.g., using pick-up coils associated with the engine's flywheel), and with the ability to identify which rotation constitutes the induction/compression rotation using the timing differences or the IdPI, embodiments of the present invention can determine the magnitude and time-variations in engine load via mathematical relationships between these and a characterization of the engine system.

Figure 4:
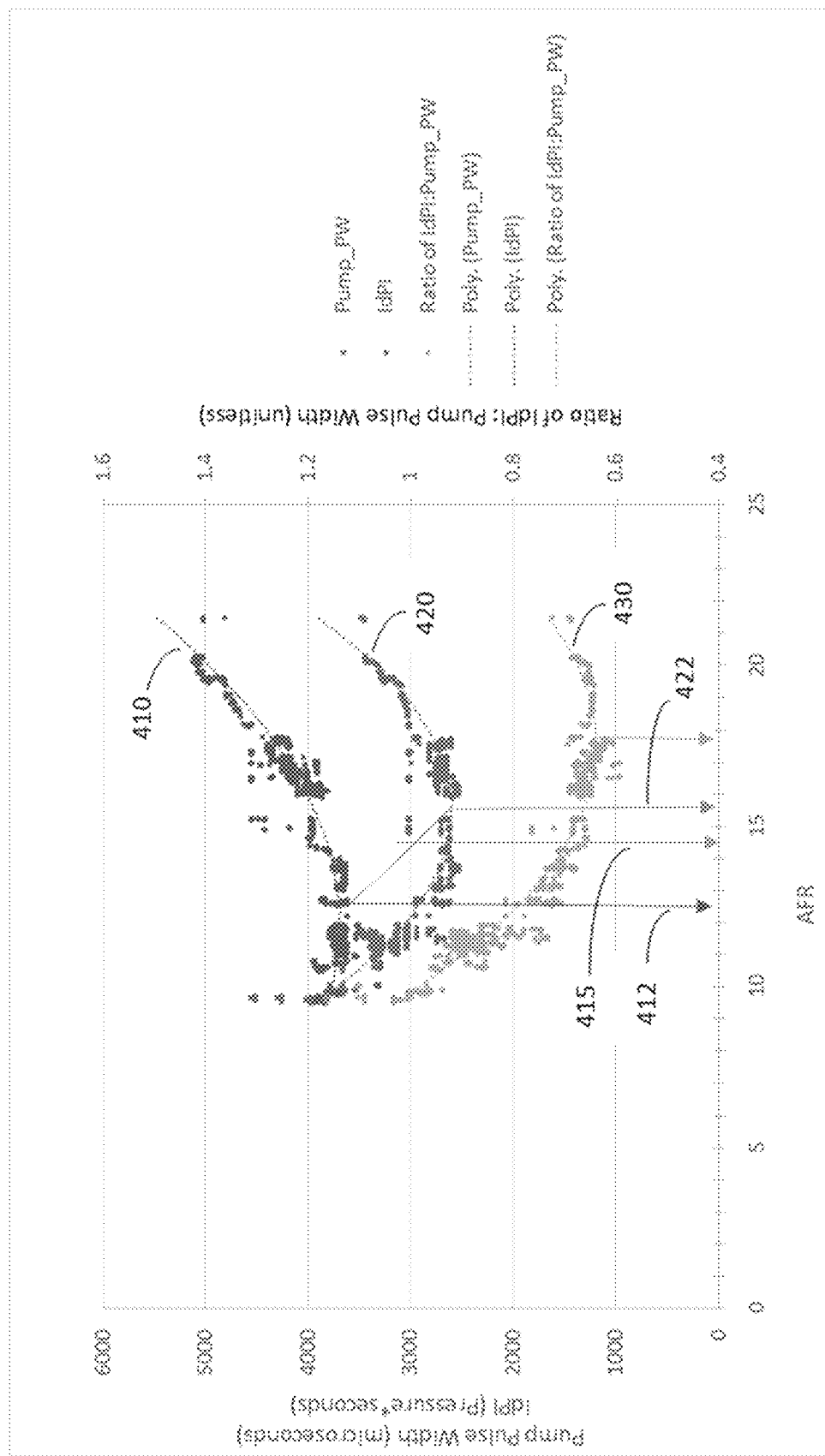
FIG. 4 is a graph illustrating power output, IdPI values, and the ratio of pump pulse width to IdPI values as a function of the air-to-fuel ratio (AFR) in an internal combustion engine according to one embodiment of the invention.

In one embodiment, after achieving startup, active fuel metering, and detection of steady load conditions, the invention provides a fuel metering system capable of closed-loop AFR adjustments to maintain a desired AFR, but without the need for expensive and complex chemical sensors in the exhaust gases typically employed in existing EFI systems. FIG. 4 is provided for reference to describe one exemplary method to achieve closed-loop AFR adjustments without a chemical sensor.

FIGS. 1 and 4 are presented with the context of all other variables in steady-state, including a constant load. FIG. 1 illustrates that maximum power is achieved at a rich Air-Fuel-Ratio of 12.6:1 (vertical line 112), as shown by the maximum-power point 115 on curve 110, and that output power falls off on either side of this ratio. In mathematical terms, curve 110 describes power as a function of AFR under conditions of constant load, and has its maxima at an AFR of 12.6:1 (vertical line 112). FIG. 1 also illustrates a stoichiometric mixture reference line 130 at which the Air-Fuel Ratio is 14.7:1, and a maximum efficiency reference line 122 at which the fuel consumption as a function of AFR is at a minima.

FIG. 4 shows graphs of several engine performance metrics as a function of AFR. Data points for each of the 3 curves shown were obtained by measurements obtained on a test bench/dynamometer and exemplary ICE. The topmost of the three curves (410) is the relationship of the volume of air inducted for a number of intake strokes (each data point comprising an intake stroke), expressed as an IdPI value on the left-side Y-axis, as a function of the air-to-fuel ratio (AFR, X-axis) under conditions of constant load. As previously stated, IdPI values are an indicator of total air inducted into the cylinder during an intake stroke. As provided in FIG. 4, the IdPI values are sensor-reported values that are not correlated to standard units of measure, but vary predictably in magnitude correlated to intake air volume for intake strokes. The units are a result of the product of pressure and time, and are processor-determined values not related to traditional units of measure (e.g., atm, Pa, psi, etc.). The IdPI curve 410 has a local minima, indicated by line 412, corresponding to an AFR of 12.6:1, which means that the ICE is achieving the requested (constant) power despite ingesting the lowest amount of air. This can be observed from the fact that the local minimum indicated by line 412 is to the left of stoichiometric reference line 415, located at an AFR of 14.7:1. Stated differently, the ICE's throttle opening was at its most-closed position, or at a setting with the least 'request for power' as commanded by the mechanical governor whose task is to maintain a goal RPM given the prevailing load. At that AFR, the ICE is producing the most power with the least amount of inducted air given conditions of constant load and RPM. The minima of the IdPI curve 410 occurs at an AFR of 12.6:1 (X-axis) which is the AFR of maximum power.

In one embodiment of the invention, a maximum-power AFR fiducial (i.e., 12.6:1) can be identified by obtaining data points similar to those of curve 410 under conditions of constant load. This may be done in an ICE having logic unit(s) (e.g., a fuel metering element controller, air induction determination unit, and/or IdPI unit) that causes the ICE to sweep through a desired series of AFR step changes over a desired range during conditions of constant load. Data points indicative of the amount of air inducted per stroke vs. AFR (IdPI values) are obtained and processed to mathematically determine the minima of the IdPI curve 410. The minima of the experimentally-determined IdPI curve identifies the AFR value that requires the minimum amount of air to achieve a desired output power associated with the engine speed controller (e.g., a governor) achieving a constant RPM value under constant-load, steady-state conditions, which corresponds to an AFR of 12.6:1. This process may be used to determine a "maximum power" AFR fiducial point 412 on IdPI curve 410 so that AFR deviations from fiducial 410 can be identified as less than or greater than an AFR of 12.6:1.

Referring again to FIG. 1, in one embodiment the invention utilizes the phenomenon, shown by the minimum point 125 on the lower curve of 120, that the best fuel economy is achieved at a lean AFR value of 15.4:1, and fuel consumption increases on either side of this AFR value given a constant load. In mathematical terms, the function describing fuel consumption as a function of AFR has its minima (125) at an AFR value of 15.4:1 (vertical line 122).

FIG. 4 also shows an X-axis relationship of AFR measured on the test bench/dynamometer to determine engine performance metrics collected with the benefit of the present invention. The middle curve 420 illustrates the relationship between amount of fuel delivered per pulse by a pump (as indicated by the pump pulse width on the left-side Y-axis of FIG. 4) and AFR. Curve 420 shows that this relationship has a minima, illustrated by vertical line 422) corresponding with an AFR value of 15.4:1. Curve 420 shows graphically that the logic unit controlling the fuel metering element (a pump in the case of the data points comprising curve 420) used the smallest pumping pulse width (i.e., metering the smallest amount of fuel) necessary to maintain the requested engine (constant) power and speed despite dispensing the smallest absolute amount of fuel, which occurs at an AFR value of 15.4:1. This means that the ICE must be operating most efficiently at this setting of fuel required (i.e., the pump pulse width), which occurs at an AFR of 15.4:1.

Finally, the bottom-most curve of FIG. 4 depicts the ratio of IdPI and fuel output (Pump_PW in this case) as a function of AFR, and illustrates a mimima at 17-18:1 for lean burn AFR. This ratio predictably provides another fiducial against which to derive and trim fuel mapping parameters, although the maximum-power and maximum-efficiency (i.e., minimum-fuel) AFR fiducials are the preferred embodiment, as discussed more fully hereinafter. By commanding the logic unit to sweep through a selected range of more or less ratio of IdPI to Pumping fuel output, the invention mathematically finds the minima of the pumping fuel output curve (Pump_PW on the left chart) and thereby derives the fuel delivery rate (e.g., pumping pulse width) which corresponds to an AFR of 15.4:1.

In one embodiment, after determining the pumping output settings which correspond to maximum power (12.6:1 AFR) and maximum fuel-efficiency (15.4:1 AFR) operating points, the invention uses interpolation to provide a pump output to achieve a desired AFR goal between these points—which may include the stoichiometric AFR at 14.7:1, and uses extrapolation if a mixture outside of these known-points is desired (e.g., 11.5 or 15.5).

In one embodiment, methods of the invention can be used to determine these maximum-power and maximum efficiency AFR fiducials even in the absence of steady-state load and/or engine RPM conditions. This is done by controlling input variables, then monitoring and collecting reference points as the engine passes through the operating zones of interest, and constructing the one or more performance curves exemplified in FIGS. 1 and 4, although the curves are constructed using datapoints collected in a non-sequential way. In one embodiment, this may be accomplished by a Parameter Determination Unit within one or more logic units or processors. The PDU may control the engine's performance for a small time period (e.g., 10-60 seconds) to sweep through sufficient AFR and operational conditions to determine fuel metering element (FME) pulse widths that correspond to, e.g., rich, lean, and stoichiometric AFRs.

FIG. 4 can be used for illustration. The data in FIG. 4 depict the derived relationship between IdPI and fuel stroke volume (e.g., expressed as a pump pulse width or duration) at a constant ICE load. However, there exist a plurality of other load conditions which can be expressed mathematically as axes (e.g., z-axis, a-axis, b-axis, etc.) in a multi-dimensional space and together these multiple dimensions comprise a surface or volume in the multi-dimensional space. Whereas FIG. 4 depicts data collected given a constant load (one slice of the z-axis is presented on the two-dimensional graph) and allows identification of inflection points of air and fuel within that two-dimensional slice of the multi-dimensional space, it is possible to collect equivalent data at a load which is, e.g. 10% greater (another slice in the z-axis which would be offset in the domain of load (z-axis) by 10% from what is shown in FIG. 4). Although FIG. 4 appears as three curves, the method only requires to observe the data, not experience it sequentially. For example, two-hundred datapoints may be observed and stored within about two seconds of ICE running, and although these datapoints may be observed in any order, the relationships in FIG. 4 may still be derived. Considering the (not shown) z-axis of load in an ICE operating in a dynamically-changing load condition, the collection of data (no particular data collection sequence is required) may occur any time the ICE is operating in the loading regime(s) of interest. Accordingly, if the load conditions of an ICE are dynamically changing, then the load conditions are traveling along different load regimes (i.e., z-axis positions) of interest, and the method can account for multiple axes affecting the location of the maximum-power and maximum-efficiency AFR fiducials, as appropriate data points (e.g., about accumulated 2-seconds of accumulated operating time within a regime (position on a multi-dimensional axis) of interest in order to identify the inflection points of interest to perform the AFR trim determination method. It will be appreciated by persons of skill in the art that the same strategies may be employed for any number of mathematical dimensions. Although depicting data in more than two dimensions is visually challenging, the mathematical analysis to determine maximum-power and maximum-efficiency AFR fiducials can be implemented by persons of skill in the art having the benefit of the present disclosure. Such analyses are mathematically more complex than the two-dimensional analysis illustrated herein, and may provide greater accuracy in fuel metering. Depending upon the implementation for different ICEs the additional cost, complexity, and calculational burden may lead persons of skill to use the two-dimensional analysis discussed herein, or may incorporate additional axes (e.g., for load, atmospheric temperature or pressure, humidity, altitude, etc.). All such implementations may be implemented and are within the level of skill of the art with the benefit of this disclosure.

In one embodiment, the derived correlation of known sensor-and-control operating points to one or more known AFRs is used to apply slight offsets to the inbuilt (e.g., open loop) relationships established at the time of manufacture when the AFRs have drifted or changed thereafter. These adaptations are employed in the form akin to the "long term" and "short term" fuel trims, which are well known in the art, although the trim values are obtained in the present disclosure in a significantly different manner from prior art trim values or settings.

In one embodiment, the FME controller periodically performs sweeps/hunting to re-establish the long- and short-term fuel trim relationships to contemporary deductions of actual AFR. In one embodiment, the maximum power and maximum fuel-efficiency fiducial points are re-established by performing sweep routines when significant speed, loading, environment, or temperature changes occur.

Although not required, in one embodiment the invention can be configured to include a chemical oxygen sensor. Inclusion of this sensor would provide a more direct and simple manner to deduce actual operating AFRs in real-time and thereafter apply necessary trims, but at the cost of increased system component counts and costs.

Figure 5:
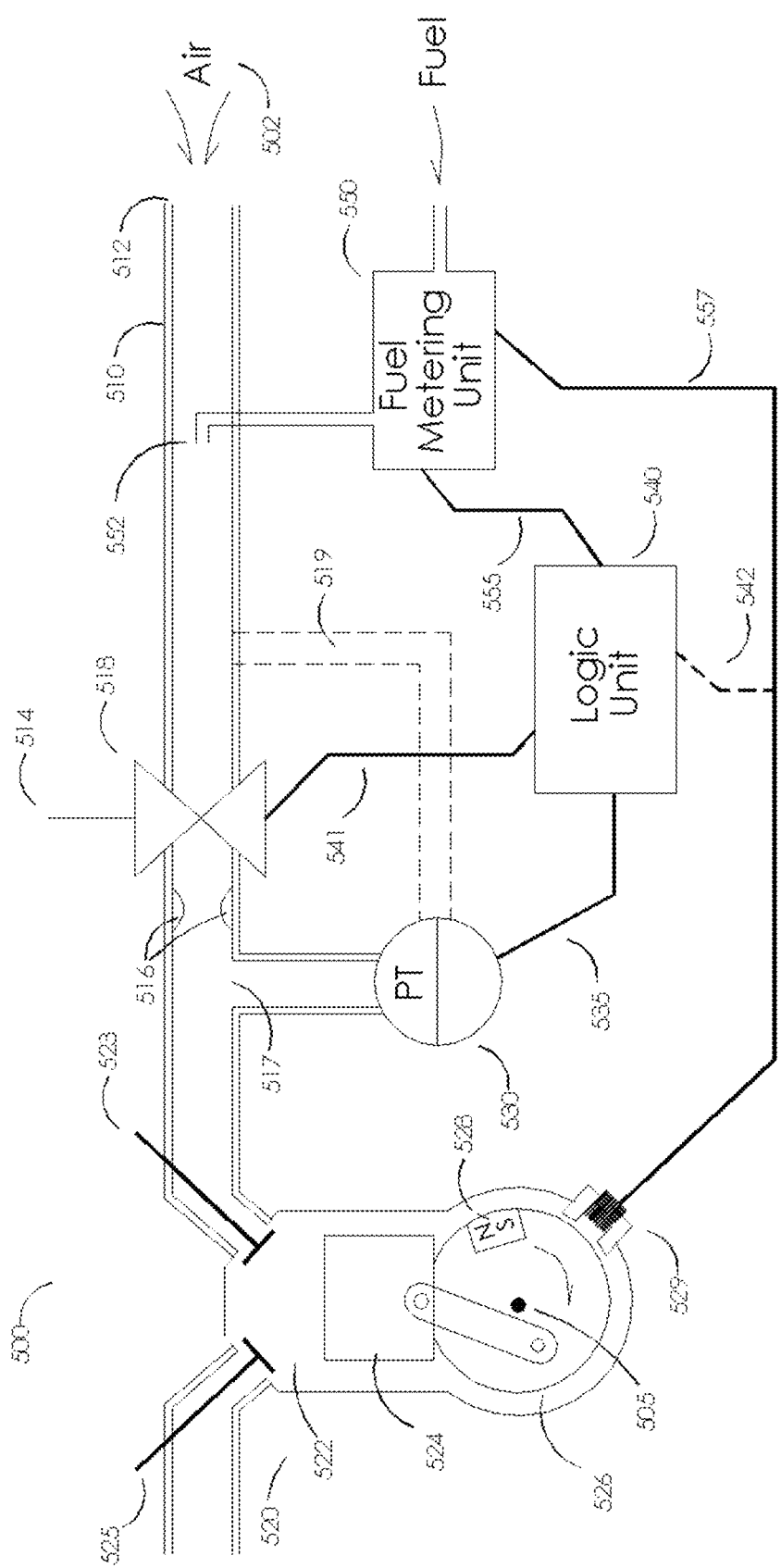
FIG. 5 is a simplified schematic diagram of a fuel metering system and internal combustion engine according to an embodiment of the invention.

Turning now to FIG. 5, an illustration is provided of one embodiment of a low-pressure electronic fuel metering (LEFM) system 500 according to the present invention. An internal combustion engine (ICE) 520 having a rotating flywheel 526 and output shaft 505 is provided. As the flywheel 526 rotates, a piston 524 moves upward and downward in the combustion chamber 522. Piston 524 travels downward and intake valve 523 is open during the intake stroke/induction cycle, drawing intake gases 502 into proximal end 512 of the induction conduit 510. Throttling valve 518 limits the airflow during the air induction/intake stroke. It is traditionally controlled by external sources (e.g., manually by a user, or automatically by a mechanical or electrical governor/controller system). Some embodiments of the present invention provide AFR control without the need for controlling or sensing the throttle valve position, aiding the design process for a given ICE 520 implementation and keeping costs low. In other embodiments, the throttle 518 may also be coupled to an induction change in pressure integration (IdPI) unit 540, as indicated by line 533. Interfacing the IdPI unit 540 with the throttle 518 would have the benefits of faster adjustment of AFR (e.g., by controlling the amount of air inducted via throttle 518 or by controlling the operation of a fuel metering unit (FME) 550). Controlling the positioning of the throttle 518 with the IdPI unit 540 would also facilitate predictive management of engine speed and loading by coordinating instantaneous fuel metering with instantaneous air intake (e.g., throttle opening), rather than having to first detect the effects of throttle movement, calculate an appropriate response, and deliver the requisite fuel dose. The ability to sense and control the throttle 518 (illustrated generally by throttle valve control line 514) is an alternative embodiment of the present invention, but since these extra sensors and actuators add cost, a preferred embodiment omits the extra sensors and/or actuators for the benefit of low cost, with an acceptable reduction in responsiveness that could be achieved with predictive AFR management. For ICE implementations requiring fast adjustments of AFR, air induction, and/or fuel metering, the sensors and/or actuators may be provided.

In some embodiments, an engineered restriction (e.g., an orifice) 516 may be provided in the induction conduit 510 in addition to the throttle 518. The air flow limiting behavior of throttle 518 (and engineered restriction 516 where present) causes reduced pressure on the engine-side of the throttle 518 (and 516 where present). The pressure is sensed by a pressure sensor 530 (e.g., a pressure transducer). Notably, when air is not flowing in induction conduit 510 (i.e., in all instances except during the intake stroke), the pressure is the same on both sides of the valve and is at the local atmospheric pressure, since the throttle 518 is not fully closed during use and its purpose is to limit air flow.

Pressure sensor 530 in one embodiment senses differential pressure on either side of the throttle 518 and engineered restriction 516 as illustrated in locations 517, 519, which would allow the system to consider the pressure drop across any air inlet filters (traditionally used in the art but not shown in FIG. 5). In a preferred implementation, pressure sensor 530 senses absolute pressure in the induction conduit 510, with resolving power from at least 0-1.2 ATM, and is capable of providing updated pressure readings at a sampling rate that is at least as fast as the Integration interval of the IdPI system. In alternative embodiments, pressure sensor 530 may be an analog sensor. A pressure sensor 530 of the absolute-type is preferred because it allows for consideration of other system restrictions such as air filters with various degrees of clogging, as well as altitude effects on air induction more or less automatically with the IdPI method.

The signal output 535 of pressure sensor 530 is monitored by an induction change in pressure (IdPI) 540. The IdPI unit 540 manages the IdPI calculations to determine the amount of air inducted into the cylinder during at least some intake strokes (e.g., intake stroke 315 or 335 of FIG. 3). The IdPI unit 540 calculates pressure values at each of a plurality of timepoints (e.g., time points $t_n$, $t_{n+1}$, $t_{n+2}$) throughout an intake stroke, and integrates the pressure values to provide an IdPI value indicative of the amount of air inducted into the cylinder during the intake stroke. The IdPI value may in some embodiments be compared to a pre-established correlation between IdPI values and the amount of air inducted into the combustion chamber. In some embodiments, the IdPI value may be used directly as a proxy value indicative of the amount of air inducted. In preferred embodiments, the IdPI unit 540 calculates the amount of air inducted into the combustion chamber for each intake stroke, although in some embodiments IdPI calculations may be performed only for some intake strokes (e.g., to save energy or reduce the processing burden on the processor in IdPI unit). In some embodiments, other methods and structures for measuring inducted air volume known in the art may be employed (e.g. with a mass-air-flow sensor), although typically at higher cost and complexity.

In one embodiment, with knowledge of the amount of air entering the combustion chamber 522, the IdPI unit 540 also calculates (or looks-up from pre-established tables) the amount of fuel that needs to be combined with the determined amount of air to achieve a target AFR goal. More particularly, the IdPI unit 540 uses a pre-established correlation between the IdPI value and the amount of fuel that a fuel metering element (FME) 550 delivers to achieve a target AFR in response to a given IdPI value. In a preferred embodiment, the FME 550 comprises a pump whose output stroke volume is determined by an electrical signal 555, 557 provided to the FME from either the IdPI logic unit 540 or by startup circuitry based on the signal from pickup coil 529, as shown by optional control line 542. The electrical signal 555, 557 is characterized by a pulse width equal to or less than (preferably less than half of) the time of an intake stroke of the ICE 520. FME 555 delivers a commanded full or partial stroke volume of fuel via a fuel delivery conduit to a fuel-air mixing location 552. Pulse width is a very easy parameter for a low-cost microcontroller to control with precision, but the signal can be of any manner able to be correlated with a FME output volume. IdPI unit 540 may in some embodiments be capable of controlling or directly sensing position of the throttle valve 518 as indicated by control line 541, and may also be coupled to the pickup coil 529 for receiving operating power.

In a preferred embodiment, FME 550 and IdPI unit 540 are powered by the electrical energy generated by permanent magnets 528 traveling past electromagnetic pick-up coils 529 situated near the engine's flywheel 526. In this way, processors within the LEFM system 500 are powered with no or minimal additional components compared to ICE designs utilizing carburetors. A further preferred embodiment captures the energy from the existing pickup coils 529 during the exhaust/intake transition where it is typical for an engine—especially a SORE engine—to collect the energy and dump it into a spark plug despite this transition not needing a spark (a 'wasted spark' system). Approximately 1 W may be harvested from a typical SORE engine primary coil, so in one embodiment, IdPI unit 540 and FME 550 are powered with the energy harvested from a pickup coil 529 during the exhaust/intake phase of the engine cycle. While this method of powering IdPI unit 540 and FME 550 are preferred, it will be appreciated that energy from a battery or other power supply may also be used. A further alternate embodiment is to store the energy collected via the pickup coils 529, such as in a capacitor, and then discharge the stored energy at a controlled interval, amplitude, and/or pulse width to meter fuel delivery from the FME 550. A still further embodiment utilizes separate or multiple coils (not shown) to harvest energy from the rotating engine.

Figure 6B:
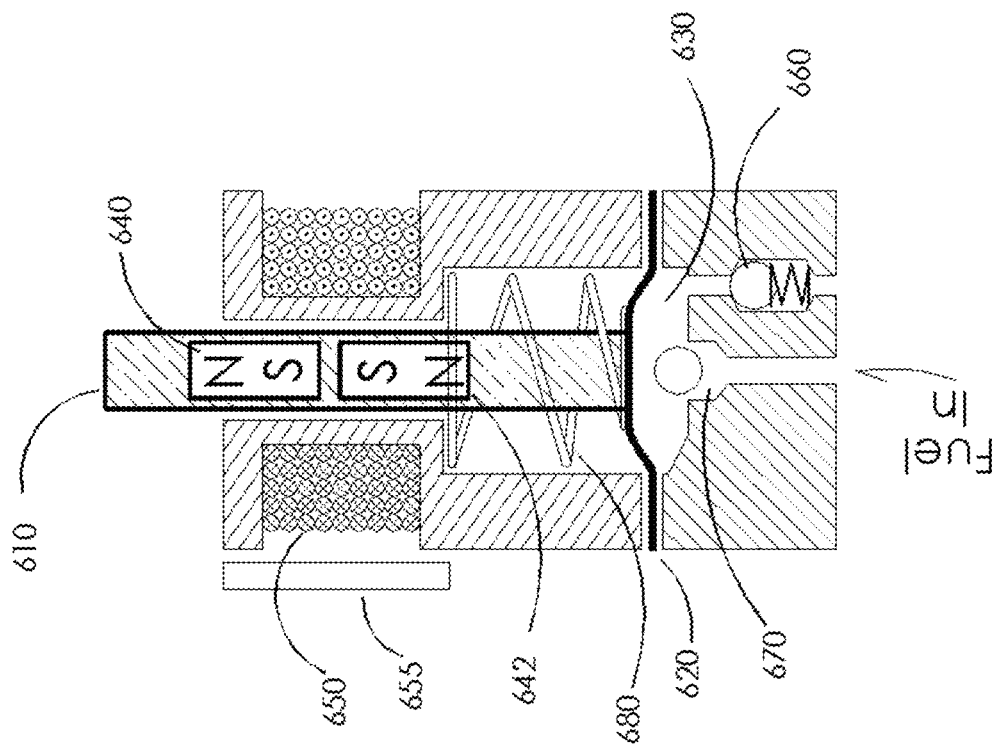
FIGS. 6A and 6B are cross-section diagrams illustrating a Micro-metering Low-pressure Pump (MLP) according to one embodiment of the present invention.
Figure 6A:
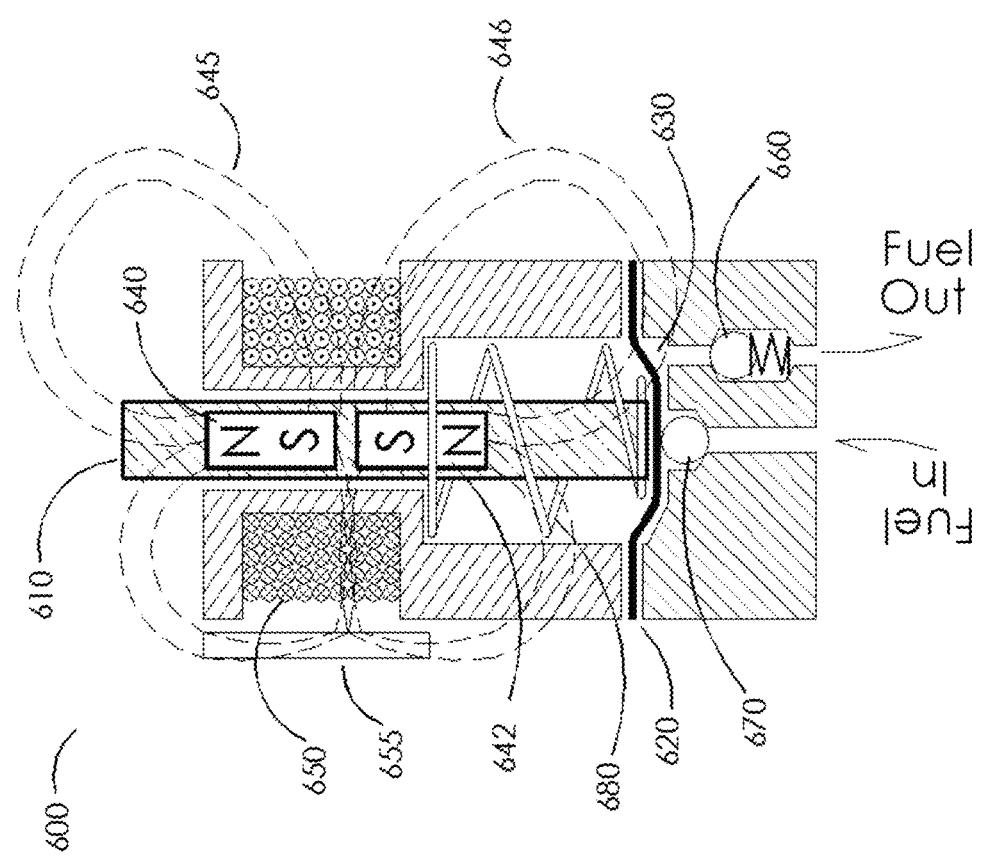

A preferred Micro-metering Low-pressure Pump (MLP) 600 for use as a fuel metering element 550 is illustrated in FIGS. 6A and 6B. Such a pump has been demonstrated to be capable of controlling fuel output in response to electrical pulse signals having pulse widths on the order of microseconds. The metered output of fuel may be delivered on either side of the throttling valve 518. If the fuel is delivered in the region which undergoes pressure drops, provisions are made to account for the pressure drop's effects on fuel flow rate. This may be performed by timing fuel delivery with consideration of the pressure swing timing as shown in FIG. 3, computationally, or by providing alternate air circuits which balance both sides of the pump in accord with varying induction conduit pressures.

FIGS. 6A and 6B illustrate an embodiment of a micro-metering low-pressure pump (MLP) 600 according to an embodiment of the present invention. It will be appreciated that many other pumps known in the art may be used to deliver fuel to achieve a desired AFR using the methods disclosed herein, and other methods to deliver a metered output of fuel using MLP 600 shown in FIGS. 6A and 6B may be used in addition to the methods described herein. FIGS. 6A and 6B provide a simplified representation of a pump design which has been demonstrated to accomplish micro-metering of fuel in a desired quantity given a varying pulse width input electrical signal with minimal moving parts, design simplicity, robustness to fouling by contaminants, ease of servicing and reassembly, passively-actuated self-closure of fuel path, and manufacturable using low cost materials and manufacturing processes. FIG. 6A shows the MLP 600 in a closed position in which no fuel is present (i.e., after delivering a full or partial stroke volume of fuel to an air-fuel mixing location in an induction conduit), while FIG. 6B shows the MLP 600 in an open position in which fuel is present in a pump chamber 630.

The MLP 600 includes an actuating element 610 which causes varying displacement in a pump chamber 630 by moving a piston 620. In a preferred embodiment, permanent magnets 640, 642 having equal magnetic poles are positioned opposite each-other to cause a high concentration of magnetic field flux to emanate outward from the interface and thus intersect the turns of an electromagnetic coil 650. In one embodiment, a core 655 comprising soft iron or similar material is provided to steer and concentrate the magnetic field flux as it intersects the electromagnetic coil 650. In a preferred embodiment, the core 655 is omitted.

Piston 620 is illustrated as a diaphragm-type piston, but it will be appreciated that this is nonlimiting and other piston geometries may be used. Permanent magnets 640, 642 are situated so as to cause magnetic field flux lines 645, 646 to intersect the turns of electromagnetic coil 650, which is shown in cross-section. Applying electrical current to the wire comprising the electromagnetic coil 650 causes electromagnetic forces to interact with the magnets 640, 642 and cause movement of actuating element 610. One-way outlet valve 660 causes fuel to flow only outward from the pump chamber 630 into a fuel delivery conduit for delivery to a fuel-air mixing location in an air supply conduit. One-way inlet valve 670 causes fuel to flow only inward toward the pump chamber 630 from a fuel source (e.g., a supply reservoir or fuel tank) and/or fuel supply conduit (not shown). As illustrated, the action of a spring 680 causes the actuating element 610 to forcibly keep the valve 670 closed even at times when the system is at rest or inactive. Maintaining all fuel exits closed during times of non-use is a design improvement over carbureted designs which enhances safety and reduces environmental pollutant emissions. In one embodiment, the MLP is part of a sealed fuel metering system with no vent or other openings to the atmosphere. The sealed system may include a fuel supply conduit having a proximal end coupled to a fuel source such as a reservoir and a distal end coupled to the pump inlet valve 670, and a fuel outlet conduit having a proximal end coupled to the pump outlet valve 660 and a distal end at a fuel-air mixing location in an air induction conduit (see, e.g., FIG. 5).

Referring again to FIG. 6, the micro-metered amount of fuel is variable and controllable by the extent/deflection of actuating element 610 in every engine cycle. With the illustrated pump 600 design, controlling electrical pulse width and/or pulse magnitude supplied to the electromagnetic coil 650 enables a fuel metering pump controller (not shown) to control the movement of actuating element 610 to provide any desired fraction (e.g., 0 to 100%) of a full stroke volume (i.e., the maximum amount of fuel the pump is capable of delivering in a single stroke or actuation event). Accordingly, a variable deflection of actuating element 610 may be achieved for every engine cycle to provide a precisely controlled, variable amount of fuel to be pumped during each intake stroke according to the dynamic work output needed from the ICE.

Figure 7:
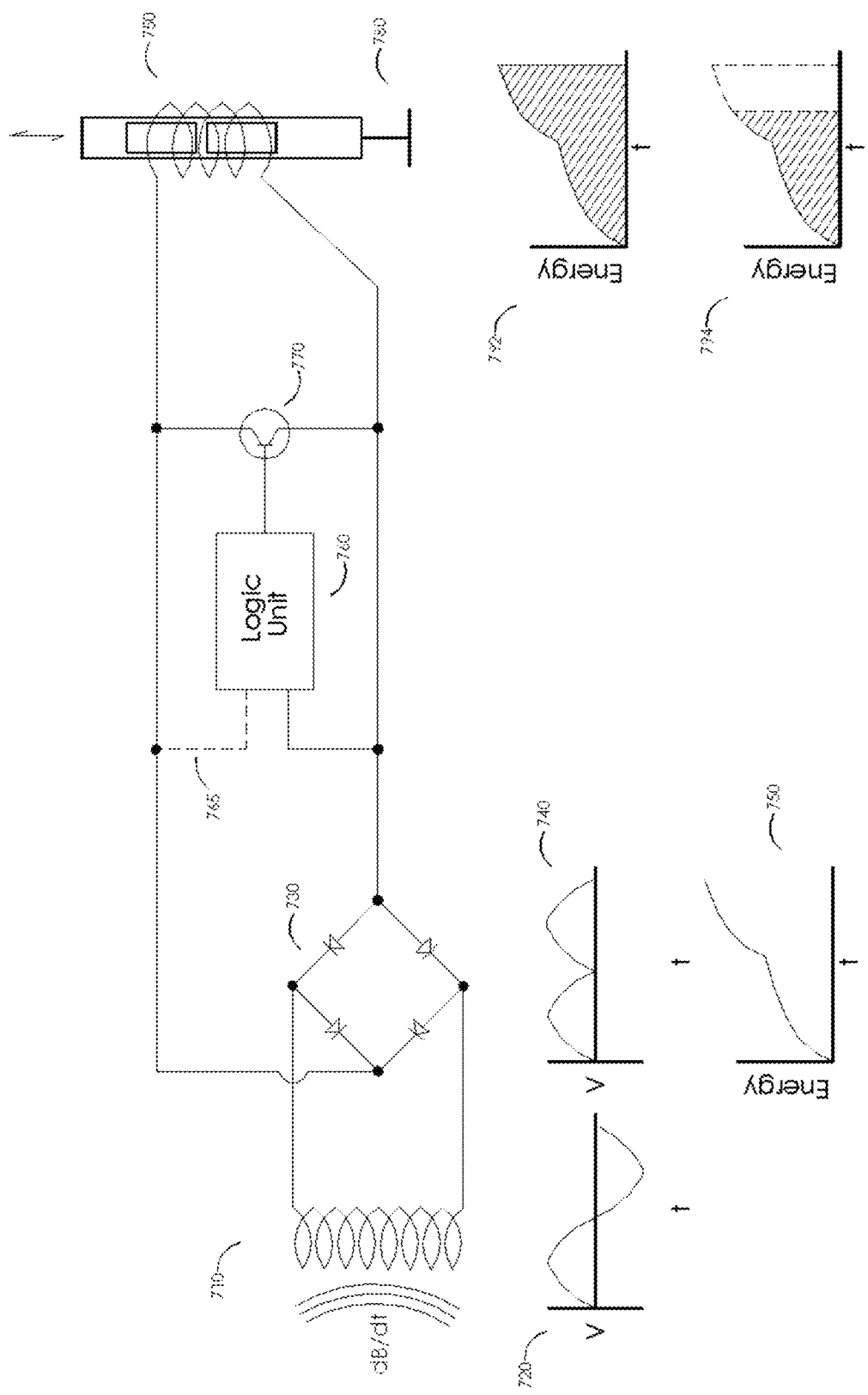
FIG. 7 is an example circuit and system configuration diagram demonstrating a method for passively activating fuel delivery even in the absence of power or logic control upon startup, according to an embodiment of the invention.

FIG. 7 is an example circuit and system configuration demonstrating one method for passively activating a fuel metering pump 780 (e.g., MLP 600, FIG. 6) even in the absence of a separate electrical power supply or logic control upon the engine startup sequence. A changing magnetic field dB/dt is supplied, typically by a pickup coil 710 energized by permanent magnet 528 rotating on a flywheel 526 (FIG. 5) of a SORE engine. The changing magnetic field produces a pulsed electromagnetic signal having voltage output values over time as illustrated by graph 720. The alternating positive/negative signal illustrated in graph 720 may be rectified as shown at 730 to produce a signal with one voltage direction as shown in graph 740. The cumulative total energy available to do work is represented in graph 750. A logic unit 760 (which may be part of or separate from the fuel metering pump controller or the IdPI units previously described) and electrically-actuated switch 770 are positioned such that the logic unit 760 may command the switch to close at any time within a time frame on the order of 10-28,000 microseconds—causing a shunt in the supply lines which would otherwise supply the electromagnetic coils 750 (e.g., coil 650, FIG. 6) of the fuel metering pump 780. During the time of shunting, energy which would have gone toward mechanical work of the actuating the fuel pump 780 is instead dumped into heat of the wires and electrically actuated switch 770. Connection 765 may be provided for energy harvesting to power the logic unit 760 and/or supply a timing/detection input to the logic unit. Although FIG. 7 illustrates one method of powering logic unit 760 and providing a timing signal, it will be appreciated that the embodiment illustrated is nonlimiting and that a variety of other methods and means for achieving the same functions may be provided in alternative embodiments.

Upon engine startup, and in the case where there is no external battery or power supply for the logic unit 760, the pickup coil 710, actuating coil 750, and pump 780 sizes are chosen such that in absence of any logic unit 760, each activation of pickup coil 710 and thereafter a pump cycle delivers a full stroke volume of fuel, in proportion to the volume of air or oxygen in a combustion chamber (e.g., 522, FIG. 5). In a preferred embodiment, the proportion is a rich but combustible amount of fuel. In alternate embodiments, the proportion is any of a combustible proportion of fuel. In an alternative embodiment, proportion is any of a combustible proportion of fuel. In an alternative embodiment, the system components are sized such that, where logic unit 760 is unpowered, an amount of fuel sufficient for a lean but combustible mixture is provided during startup and the logic unit then computes an additional amount of fuel (beyond the lean startup stroke volume) to be delivered during active-control periods to achieve a target AFR.

Thus, in a preferred embodiment, upon first startup of the ICE and before the logic unit 760 boots software and begins controlling the fuel delivery by the pump 780, the engine receives a slightly rich AFR which results from a complete, un-shunted dose of electrical energy 750, 792 into coil 750 of the pump. Enriched AFR is the preferred starting condition for existing carbureted and electronic fuel injection fuel metering systems and is also achieved with the present invention.

After the first few strokes of engine startup, when the logic unit has accumulated enough energy and time to boot its software, the logic unit 760 begins to actively managing AFR by causing switch 770 to close/shunt the energy at a predetermined timepoint within the fuel metering stroke of pump 780 (e.g., before all of the energy harvested by pickup coils 710 from the engine coils it is delivered to electromagnetic coils 750 of pump 780. Shunting the energy, as shown in graph 794 illustrating delivery of a partial stroke volume of fuel, has the result of reducing the metered amount of fuel in a predetermined relationship to achieve a desired target AFR. It will be recognized in view of the present disclosure that the area under the energy curve 794 (and thus the fraction of a full stroke volume of fuel from pump 780) may also be controlled by other means, such as positioning an electrically controlled switch causing the pump-activating circuit to be disconnected from the pump as a means to limit energy supplied to the pump actuating element (e.g., 610 FIGS. 6A, 6B), and these may be accomplished without undue experimentation with the benefit of this disclosure. In an alternative embodiment, the un-controlled ("passive") fuel volume that is delivered when the logic unit 760 is not operational may be sized such that a combustible yet lean (e.g., having an AFR greater than 14.7) fuel mixture is delivered, and the logic unit 760 operates by commanding the pump to provide an additional dose of fuel greater than the passive lean volume to adjust fuel mixture to achieve a target AFR.

FIG. 7 illustrates one embodiment of controlling fuel metering without a separate electrical power supply by passively-actuated fuel metering in the rich regime, and when the logic unit 760 is powered and activated, the logic unit may cause an inhibition effect of the otherwise-passively-activated fuel metering down from the rich regime to increase the proportion of air in the mixture and achieve a desired target AFR. Current EFI systems must be powered and allow time for the logic unit 760 to boot up and to stabilize sensor and software function before the engine can begin to initiate combustion/running and actively control fuel delivery. In embodiments of the present invention, control of fuel delivery may occur without intervention from the logic unit 760. This behavior is referred to as passively-actuated because the acts of causing fuel delivery in response to engine turning occurs without need for a pre-powered logic unit 760, and in a preferred embodiment without any external power sources. This is possible because the passively-actuated elements provide fuel delivery in a state that is excessively rich for stable engine conditions, but preferred for engine startup. After engine starting and running commences, an active logic unit asserts fuel control authority by shunting or damping the passively-actuated subsystem elements. This is significantly different from the existing EFI paradigm. In addition, embodiments of the present invention may control fuel delivery and AFR using considerably less power than existing EFI systems, such as shunting a portion of an existing energizing event. Benefits which arise from this paradigm are the ability to allow engine startup without need for a power subsystem which removes the costs, weight, and complexities of those power subsystems, and allows for use a smaller, lower cost logic it and switching electronics.

Other manners of achieving the new control paradigm than as illustrated in FIG. 7 can be achieved without undue experimentation with the benefit of this disclosure, and these are considered within the scope of the invention, which is limited only by the claims. For example, a Bernoulli-type air/fuel flow delivery structure may be provided which meters fuel through a venturi in an excessively rich state in absence of control logic, and upon the power-up of controlling software, the logic unit may apply a flow restriction within the fuel channel via simple solenoid or other actuator. In another example, a mechanical moving element with one end performing mechanical work to energize a micro-metering pump and a second end placed in the vicinity of a magnet which moves in association with at least one of the engine's many moving components. An electromagnetic structure whose circuit is passively shunted may be mechanically affixed to the pump's mechanical moving element's second end such that when the magnet moves past the electro-magnet, the counter-EMF of the shunted coil causes the mechanical element to actuate completely and in a magnitude to deliver a volume of fuel sufficient to achieve a combustible target AFR. As the control logic becomes powered, it may alter the magnitude of the pumping stroke by causing a momentary open circuit of the electromagnetic structure, thus relieving some of the counter-EMF and thus delivering a smaller pump stroke and fuel dose.

In one aspect, the present invention includes methods for controlling the air-fuel ratio (AFR) of an operating (i.e., running) internal combustion engine (ICE). The ICE may be an engine that operates by a series of strokes including an intake stroke and a combustion stroke, and may include a speed controller to maintain a target constant rotational speed and an air intake determination unit (AIDU) to determine an air intake parameter indicative of the amount of air inducted into the ICE during an intake stroke.

Figure 8:
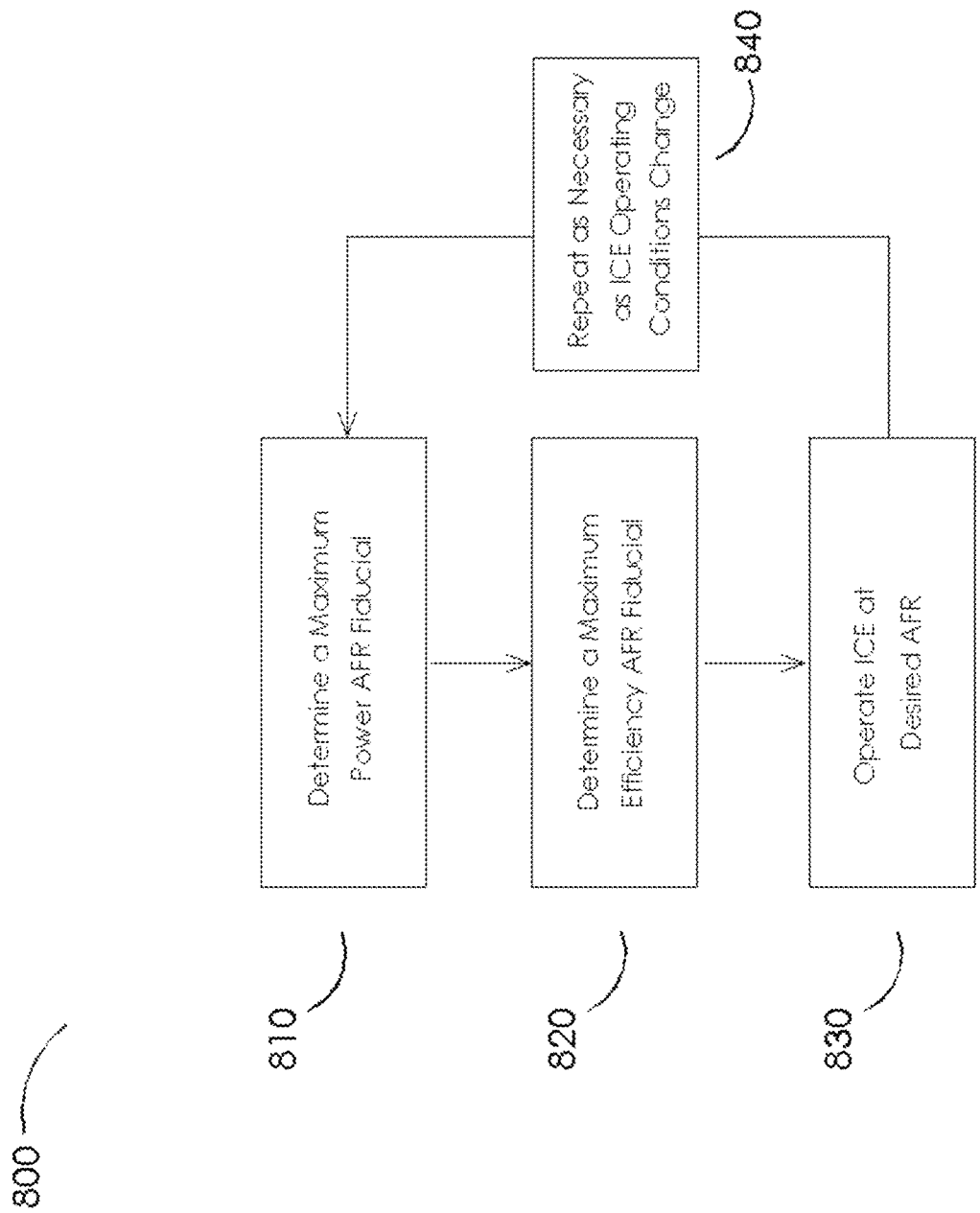
FIG. 8 is a flow chart illustrating a method of controlling the operation of an internal combustion engine at a desired AFR according to one embodiment of the invention.

FIG. 8 is a simplified flowchart of the steps of one such method 800 for controlling the AFR in an operating ICE. The method is implemented by determining two AFR fiducial values (maximum-power and maximum-efficiency) while operating at steady-state conditions. The two AFR fiducial values establish reference (fiducial) points at which the actual AFR is determined based on unchanging but observable physical phenomena (i.e., peak power and optimum efficiency) in lieu of providing a chemical or temperature sensor in the exhaust gas as a means to determine the actual AFR. By determining the actual AFR on an as-needed basis, the inherent drift and imperfections of an ICE's measurement and control systems may be compensated for (i.e., calibrated or trimmed) to return the ICE to intended and optimal performance repeatedly throughout its service life. The two AFR fiducial values may then be used as reference points to determine how much fuel must be delivered by a fuel metering element (FME) for each intake stroke to achieve a target AFR (e.g., 12.5:1, 13.0:1, 13.5:1, 14.0:1, 14.5:1, 15.0:1, etc.). Because AFR values are ratios that are always normalized such that the amount of fuel is 1, AFR values may equivalently be expressed simply by the first number. Thus, an AFR value of 12.5:1 may for simplicity be stated as simply 12.5, since that is the relative amount of air to a unitary amount of fuel. The AFR fiducials may be used by one or more controllers in the system to control the amount of air and/or fuel to achieve any desired target AFR.

The method 800 includes the step of determining a maximum-power AFR fiducial (810) at step 810. The maximum-power fiducial is an identification of a reference point at which the ratio of air and fuel are known to be 12.6, which is the AFR value at which the ICE produces the maximum power. The significance of the maximum-power AFR fiducial is discussed in greater detail above in connection with FIGS. 1, 3, and 4, and step 810 is discussed in greater detail in connection with FIG. 9 below.

The method 800 also includes the step of determining a maximum-efficiency AFR fiducial at step 820. The maximum-efficiency fiducial is a reference point at which the ratio of air and fuel are known to be 15.4, which is the AFR value at which the ICE requires the minimum amount of fuel to achieve a target operating speed. The maximum-efficiency AFR fiducial is also discussed in connection with FIGS. 1, 3, and 4, and step 820 is discussed in greater detail in connection with FIG. 10 below.

Once the maximum-power and maximum fuel-efficiency AFR fiducials are known, the amount of fuel required to achieve any other AFR value can be determined by a processor either by interpolation between the fuel required for the maximum-power and the maximum-efficiency fiducials, or by extrapolation from one of the values. Thus, the method 800 further comprises the step 830 of operating the ICE at a desired AFR by controlling the amount of fuel delivered into the combustion chamber of the ICE for each intake stroke. For example, calculation of the fuel to be metered by a pump for each intake stroke at a particular throttle setting to achieve an AFR of between 12.6 and 15.4 may be obtained by interpolation (e.g., linear interpolation or other optimal relationship established by the ICE manufacturer) between fuel required for the maximum-power AFR of 12.6 and the fuel required for the maximum-efficiency AFR of 15.4. Values below 12.6 can be calculated by extrapolation from the maximum-power AFR of 12.6, and AFR values above 15.4 can be determined by extrapolation from the maximum-efficiency AFR of 15.4. In some embodiments, the method further comprises repeating steps 810, 820, and 830 to redetermine the fiducials and operate the ICE when operating conditions change (840).

Figure 9:
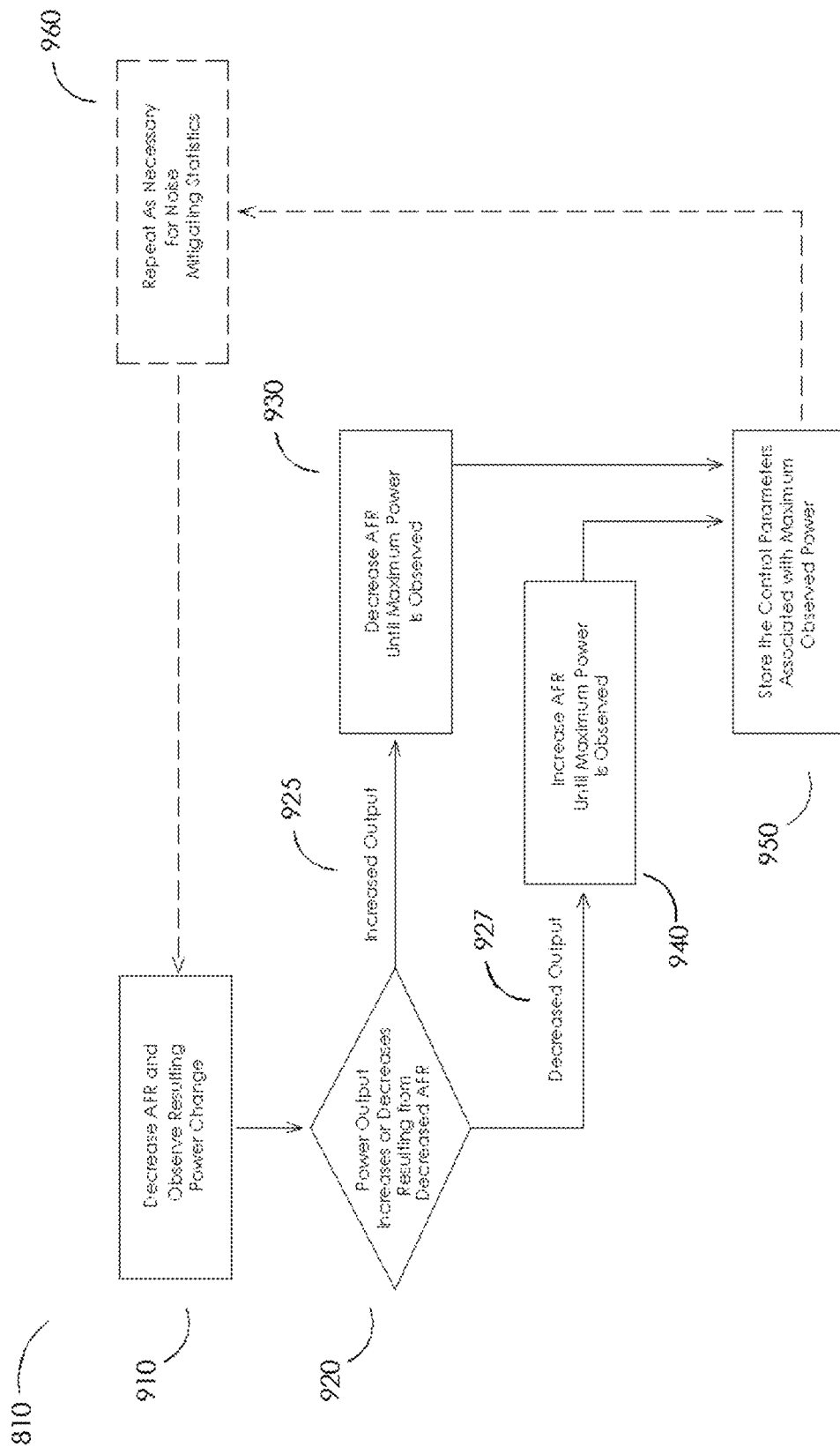
FIG. 9 is a flow chart illustrating a method of determining a maximum power AFR fiducial for a running ICE according to an embodiment of the invention.

FIG. 9 is a flowchart providing greater detail on the step 810 of FIG. 8 on how to determine the maximum-power AFR fiducial. The method is implemented for an ICE initially operating at steady-state, constant load conditions at some AFR (including an unknown AFR). The method includes the step 910 of decreasing the AFR (i.e., increasing the amount of fuel delivered per stroke relative to the amount of air), and determining a change in ICE power output (920) in response to the change in AFR.

If the change in output power at determination step 920 is an increase (925), the method comprises (930) again decreasing the AFR, determining a change in power output of the ICE, and repeating the decrease 930 in AFR and determination of a change in output power until the ICE power output decreases in response to any decrease in AFR, and identifying the maximum-power AFR fiducial as the AFR at which any change in the AFR results in a decrease in the power output of the ICE.

Returning to determination step 920, if the change in output power at determination step 920 is a decrease (927) in response to the AFR decrease of step 910, the method comprises (940) increasing the AFR (i.e., reducing the amount of fuel delivered per stroke relative to the amount of air), determining a change in the power output of the ICE, and repeating the increase 940 in AFR and determining a change in output power until the ICE power decreases in response to any further increase in AFR, and identifying the maximum-power AFR fiducial as the AFR at which any further increase in AFR results in a decrease in ICE power output. As described in connection with FIG. 4, maximum power may be interpreted as the setting where the requested load and rpm is maintained yet while consuming the least volume of air—deduced by observing the smallest IdPI per stroke and equivalently the smallest throttling valve opening under the constant load conditions.

In some embodiments, the method further comprises (950) storing or logging the control parameters (e.g., the fraction of a full stroke volume of fuel from a pump) provided in response to the volume of air inducted) that achieves the maximum-power AFR. When operating conditions change during the operation of the ICE (e.g., operating parameters such as acceleration or deceleration requests, engine load, intake air temperature, intake air humidity, intake air pressure, altitude, engine running duration, engine temperature, engine rotational speed, fuel quality, or other inputs received from system status monitoring sensors, the method may include changing the target AFR to cause the fuel metering system to switch between a stoichiometric mixture, a rich mixture, and a lean mixture, or to make slight adjustments within the rich or lean mixture regimes. Algorithms operating in one or more processors may operate to make such changes.

In some embodiments, the method further comprises repeating the steps of the method to redetermine the maximum-power AFR fiducial (960). When operating conditions change in a significant degree (e.g., more significant changes in the parameters noted above) it may be advisable to repeat the steps 910-950 to re-establish an accurate maximum-power AFR fiducial.

Figure 10:
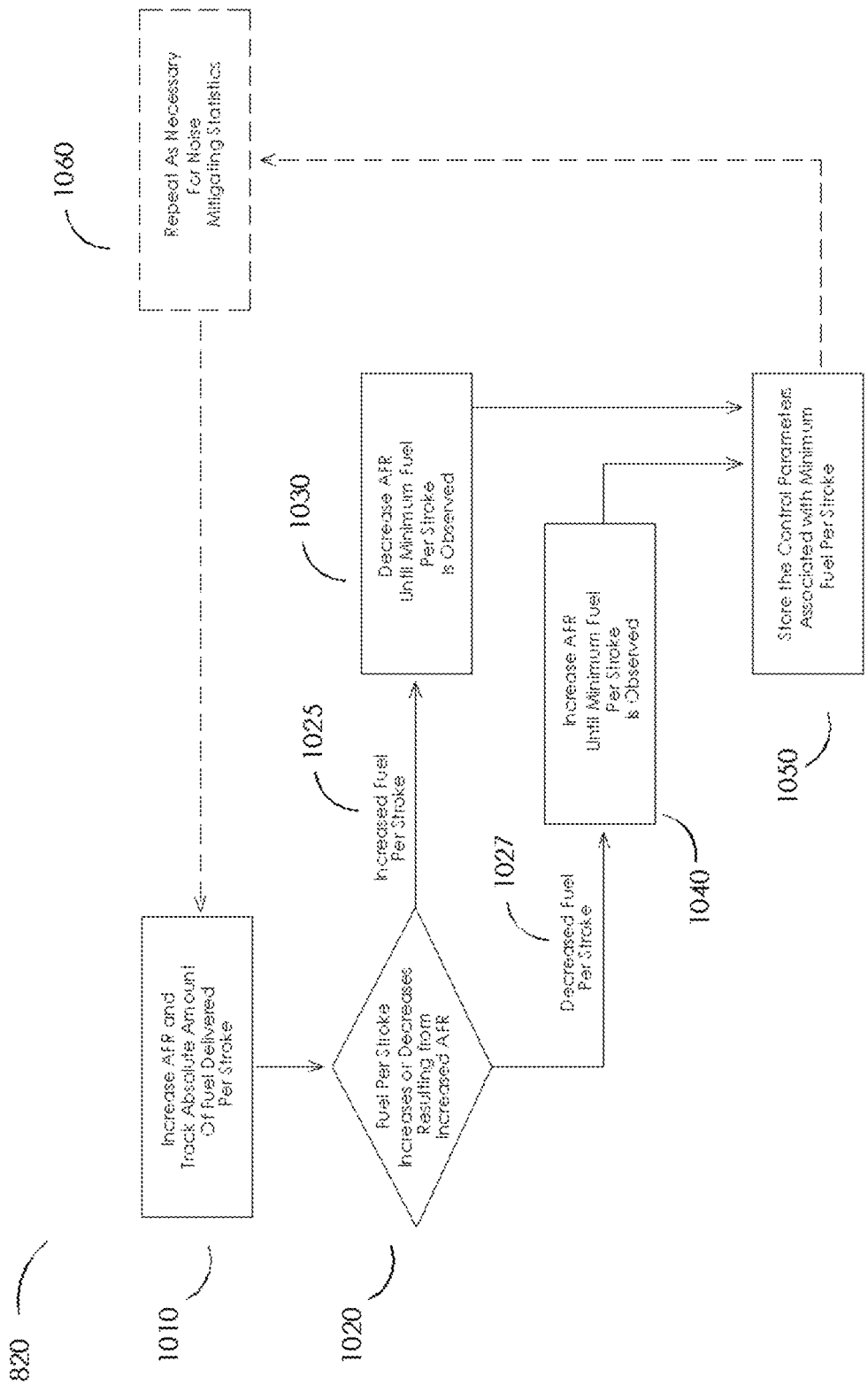
FIG. 10 is a flow chart illustrating a method of determining a maximum fuel-efficiency AFR fiducial for a running ICE according to an embodiment of the invention.

FIG. 10 is a flowchart providing greater detail on the step 820 of FIG. 8 of how to determine the maximum-efficiency AFR fiducial. The method is implemented for an ICE initially operating at steady-state, constant load conditions at an arbitrary (possibly unknown) AFR. The method includes the step 1010 of increasing the AFR (i.e., decreasing the amount of fuel delivered per stroke relative to the amount of air) and determining (1020) any change in the absolute amount of fuel injected for each intake stroke.

If the absolute amount of fuel injected for each intake stroke at the determining step 1020 is observed to decrease (1027) as the ICE speed controller maintains the ICE at a constant rpm, the method comprises (1040) again increasing the AFR (i.e., decreasing the relative amount of fuel), determining a change in the absolute amount of fuel injected for each intake stroke, and repeating the increase 1040 in AFR and determination of a change in the absolute amount of fuel injected per stroke until the absolute amount of fuel injected for each intake stroke increases in response to the increase in AFR. The maximum-efficiency AFR is the AFR at which any further increase in AFR results an increase in the absolute amount of fuel injected per stroke. Stated differently, the maximum-efficiency AFR is the AFR at which the absolute amount of fuel required to maintain the ICE rotational speed is minimized.

Returning the determination step 1020, if the absolute amount of fuel injected for each intake stroke was observed to increase (1025) in response to the increase in AFR at step 1010, the method comprises decreasing (1030) the AFR and determining a change in the absolute amount of fuel injected in response to the decrease in AFR. If the absolute amount of fuel injected for each intake stroke decreases in response to the AFR decrease in step 1030, the method comprises repeating the step 1030 of decreasing the AFR and determining a change in the absolute amount of fuel injected for each intake stroke until the absolute amount of fuel injected for each intake stroke increases in response to a decrease in AFR. The maximum-efficiency is the AFR at which any further decrease in AFR results in an increase in the absolute amount of fuel injected for each intake stroke. As with step 1040, the maximum-efficiency AFR is the AFR at which the absolute amount of fuel per stroke required to maintain the ICE at its controlled rotational speed is minimized.

In some embodiments, the method further comprises (1050) storing or logging the control parameters (e.g., the fraction of a full stroke volume of fuel from a pump and/or the amount of air inducted for each intake stroke) that achieves the minimum-power AFR. When operating conditions change during the operation of the ICE (e.g., based operating parameters such as acceleration or deceleration requests, engine load, intake air temperature, intake air humidity, intake air pressure, altitude, engine running duration, engine temperature, engine rotational speed, fuel quality, or other inputs received from system status monitoring sensors, the method may include changing the target AFR to cause the fuel metering system to switch between a stoichiometric mixture, a rich mixture, and a lean mixture, or to make slight adjustments within the rich or lean mixture regimes. Algorithms operating in one or more processors may operate to make such changes.

In some embodiments, the method further comprises repeating the steps of the method to redetermine the maximum-efficiency AFR fiducial (1060). When operating conditions change in a significant degree (e.g., more significant changes in the parameters noted above), steps 1010-1050 may be repeated to re-establish an accurate maximum-efficiency AFR fiducial.

Once the maximum-power and maximum-efficiency fiducials are known, the ICE may be operated at any desired AFR by controlling the amount of fuel delivered into the combustion chamber for each intake stroke (using, e.g., the FME controller) based on interpolation or extrapolation from the two fiducials. In addition, although the steps of determining a change in engine power output in response to increases or decreases in AFR when determining the maximum-power AFR fiducial can be performed in one embodiment based on a single intake stroke, in some embodiments the change in power output is determined over several engine cycles (e.g., 2, 5, 10, 50, or 100 or more intake cycles), and a measure of central tendency for the power output over those cycles is used as the power change. Similarly, although the steps of determining a change in the absolute amount of fuel injected or delivered to the combustion chamber in response to increases or decreases in AFR when determining the maximum-efficiency AFR fiducial can be performed based on a single intake stroke, in some embodiments the change in absolute amount of fuel is determined over several engine cycles and a measure of central tendency for absolute amount of fuel injected is used as the change in fuel injected.

In one embodiment, the invention comprises a method of controlling the AFR of an operating ICE without sensing chemical composition (e.g., $O_2$ concentration) of the exhaust gas of the ICE. The method may comprise determining one or both of the maximum-power and maximum-efficiency AFR fiducials, which may be used to control the amount of fuel delivered for each intake stroke of the ICE without determining the chemical composition of the exhaust gases.

In another embodiment, the invention comprises a method of controlling the AFR of an operating ICE without sensing or otherwise determining the temperature of the exhaust gas of the ICE. The method may comprise determining one or both of the maximum-power and maximum-efficiency AFR fiducials, which may be used to control the amount of fuel delivered for each intake stroke of the ICE without determining the chemical composition of the exhaust gases.

In some embodiments, the method comprises determining a change in power output of the ICE in response to a change in AFR based on a change in engine rotational speed in response to the change (i.e., increase or decrease) in AFR. In some embodiments, the change in power output in response to a change in AFR is based on a change of throttle position implemented by the ICE speed controller in response to a change in AFR (e.g., implemented by a fuel metering element controller).

In one embodiment of the invention power fiducial is determined by identifying one of 1) the throttle position corresponding to the smallest amount of air inducted at which the ICE speed controller can maintain a constant speed under conditions of constant load, and 2) the minimum amount of air inducted into the ICE at which the speed controller can maintain a constant speed under conditions of constant load.

In some embodiments, decreasing the AFR may be performed by at least one of decreasing the amount of air inducted into the ICE and increasing the amount of fuel injected into the ICE for each induction stroke. In some embodiments, increasing the AFR may be performed by at least one of increasing the amount of air inducted into the ICE and decreasing the amount of fuel injected into the ICE for each induction stroke.

In some embodiments, determining a power output of the ICE at a particular AFR setting comprises determining a measure of central tendency of the power output at the AFR setting for a plurality of engine cycles, and determining a change in power output after a change in AFR includes comparing the measure of central tendency of the power output before the change to the measure of central tendency of the power output after the change in AFR.

In one embodiment, the invention comprises a non-transitory computer-readable medium storing code for execution by a processor to perform a method of controlling the AFR of an operating ICE. The method may be a method that includes determining one or more of a maximum-power AFR fiducial and a maximum-efficiency AFR fiducial as described in connection with the FIGS. 8-19 and the foregoing paragraphs.

In some embodiments, the invention comprises a method of controlling the AFR of an operating ICE based on at least one of the maximum-power AFR fiducial and the maximum-efficiency AFR fiducial and on a slope of a power vs AFR curve for the ICE. Referring again to FIG. 1, it is apparent that the power-AFR curve 110 has a smooth and continuously-varying slope that includes positive slope values (e.g., on the left side of the maximum-power AFR point 115), and negative slope values (e.g., on the right side of the maximum-power AFR point 115). Because the slope of the curve is continuously-varying, each data point on the curve is characterized by a unique slope value. Accordingly, any point on the curve may be determined with knowledge of the slope of the power-AFR curve when operating the ICE at an unknown AFR and its distance (X-axis) from one of the maximum-power AFR fiducial and the maximum-efficiency AFR fiducial.

In one embodiment, method involves characterizing at least a portion of the power performance of the ICE, determining one of the maximum-power and maximum-efficiency AFR fiducials, and operating the ICE at a desired AFR based on the maximum-power or maximum-efficiency AFR fiducials and the power output of the ICE in the region of the desired AFR. Characterizing a portion of the power performance of the ICE may comprise creating (e.g., by operating the ICE at a plurality of AFR values that include both lean and rich AFR values (and preferably lean AFR values in excess of 15.4 and rich AFR values less than 12.6) and determining the power output of the ICE for a plurality engine cycles at each AFR in the plurality of AFR values. Characterizing a portion of the power performance of the ICE may also comprise accessing or receiving a known power-AFR curve for the ICE and using the power-AFR curve to determine a slope (i.e., rate of change of power) for a candidate AFR by operating the ICE at a plurality of AFR settings near the candidate AFR. Determining the power output of the AFR in the region of candidate AFR in one embodiment comprises determining the slope of the power-AFR curve for the ICE at (or near) the candidate AFR by operating the ICE at one or more AFR values in close proximity to the candidate AFT and determining a rate of change of power for the candidate AFR (e.g., a local slope of the AFR-power curve). With knowledge of the fuel amount and air inducted at one of the AFR fiducials, the system may determine the actual AFR of the candidate AFR by comparing the experimentally determined power slope behavior for the candidate AFR to the slope of the known or determined AFR curve. If the candidate AFR is not the desired AFR value, the system may adjust one or more of the air inducted or fuel delivered for each intake stroke to operate the ICE at the desired AFR.

Figure 11:
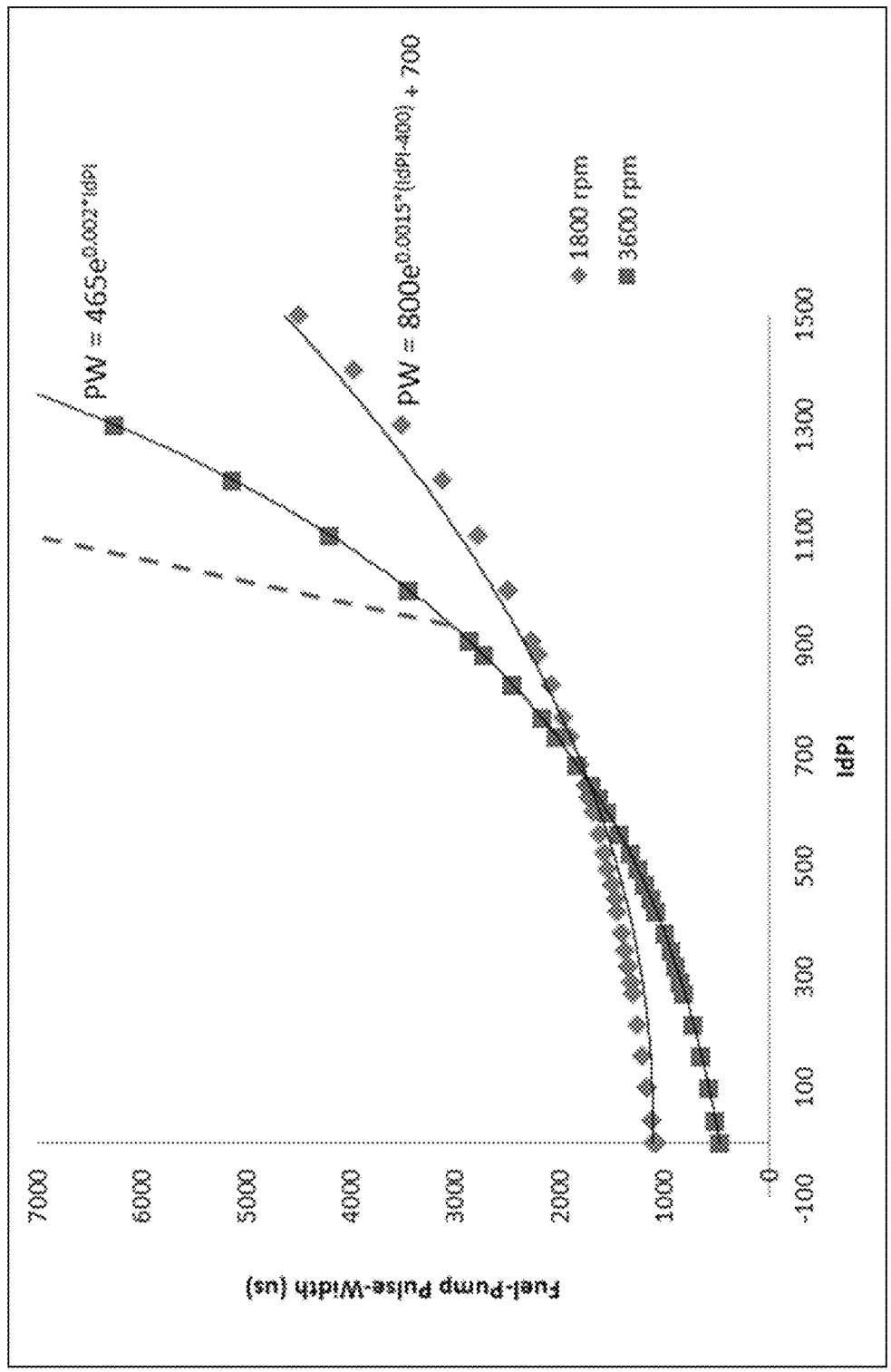
FIG. 11 is a graph illustrating a relationship between the IdPI measured metric and a prescribed fuel output variable according to one embodiment of the invention.

FIG. 11 illustrates an example relationship between the IdPI measured metric and a prescribed fuel output variable (pulse width of the pump stroke control signal in the illustrated case). The engine's instantaneous operating speed (RPM) is determined by monitoring the IdPI pressure sensor signal, rotation of the engine's shaft, or other methods known in the art. For every intake stroke, a value for IdPI is obtained as given on the X-axis. During configuration of the specific engine, bench testing determines the relationship between the IdPI variable and the prescribed fuel output variable necessary to achieve a goal AFR. Fuel pump pulse width of the MLP is given here for an exemplary engine for illustrative purposes only. In a preferred embodiment, the relationships may be represented by equations (shown in FIG. 5 for two example curves) simply calculable by one or more Logic Units (e.g., 540, 760). In a preferred embodiment, slight adjustments ('trims') may be accomplished by adjusting only one or a few variables of the equations of FIG. 11. For example, adjusting the value of the constant having a value of 700 for the 1800 RPM curve of FIG. 11 effectively moves the curve upward/downward, while adjusting the exponential constant having a value of 0.002 in the 3600 RPM curve effectively increases/decreases the 'steepness' of the curve. In an alternate embodiment, the Logic Unit(s) (540, 760) may include a lookup table of pre-determined values of one or more input variables (e.g., RPM, IdPI, load metric, temperature, running duration, etc.) and perform a look-up of the necessary fuel delivery output variable to best-match the pre-determined values in the lookup table(s).

Noteworthy from FIG. 1, if the preferred operating point is lean-of-peak power, such as best efficiency 15.4:1, the operating point exists on a 'slippery slope' of power vs lean AFR. This is especially problematic when operating on a steep part of the lean slope, and the throttle valve is opened unexpectedly. The opening of the throttling valve allows more air into the cylinder and thus can cause AFR to become even more lean, resulting in an even lower power point on the AFR/power curve. If this cascading effect proceeds for more than a few engine strokes (e.g. for more than a fraction of a second), this can cause lean flame-out/the engine to stop running abruptly upon opening of the throttling valve. To overcome this problem, embodiments of the invention may implement a technique of "acceleration enrichment." In this invention, we may apply a steeper slope to the curve (dashed-line in FIG. 11) at a point just beyond the steady-state operating point which causes any given IdPI value to be prescribed more fuel than would normally be prescribed, thus enriching the mixture beyond the pre-determined values that would be obtained by using the equation unmodified. The location of the inflection point is calculated and adapted to be just beyond the present IdPI operating point such that an immediate wider-opening of the throttling valve is met with a fuel mixture which is more enriched than would otherwise be prescribed with steady-state running. Meeting an abrupt throttle opening with a slightly enriched mixture causes the operating point to increase on the power curve, thus aiding the engine to increase its output as is the request by increasing the throttle opening.

Also noteworthy from FIG. 1 is that the system of the invention can affect power delivery without access to the throttling valve by manipulating the AFR at any given throttling valve position. This gives a benefit of reduced system cost and easier integration with existing designs. If for example the steady-state operating point is chosen to be best efficiency AFR of 15.4:1, then the LEFM system may affect more power at the present throttle opening setting by instantly delivering an AFR with more power e.g. 12.8:1. From this control authority arises the ability to dampen/control harmonic/hunting-fluctuations in throttle and engine rpm common with mechanically-controlled governors. Further, if the engine is loaded to such an extent that it cannot maintain goal rpm at a lean AFR, the LEFM may be programmed or commanded to enrich to provide more power—up to a maximum power AFR of 12.8:1 AFR. In this way, the LEFM invention may affect the benefits of computer-controlled logic to the existing mechanically-controlled designs with no additional costs since these benefits arise from an added behavior in software, whose additional manufacturing cost is zero due to the nature of software duplication manufacturing operations.

The advantages of the present invention include, without limitation, the benefits which can arise from using software logic to adapt air-fuel ratio metering and control in an internal combustion engine.

In broad embodiment, the present invention is an apparatus to mix fuel into the air intake of an internal combustion engine.

In various embodiments, the present invention relates to the subject matter of the following numbered paragraphs.

201. A fuel metering system for an internal combustion engine (ICE), the ICE having a maximum power output, at least a first combustion chamber associated with at least a first cylinder, and at least an intake stroke and a combustion stroke, the fuel metering system comprising:
a fuel injection timing unit providing a first timing signal indicative of the occurrence of at least one timepoint during an intake stroke;
a fuel metering element (FME) having a predetermined full stroke volume for metering fuel into an air-fuel mixing location in the ICE during the intake stroke, wherein the predetermined full stroke volume is a volume of fuel creating one of a rich, combustible fuel mixture and a stoichiometric fuel mixture in the at least a first combustion chamber of the ICE at maximum ICE power output; and
a FME controller operatively coupled to the FME to control the delivery of fuel to the air-fuel mixing location in response to the first timing signal, and to control the stroke volume of the FME to deliver one of a full stroke volume of fuel and a fraction of a full stroke volume of fuel to achieve a desired AFR.

202. The fuel metering system of numbered paragraph 201, wherein the fuel injection timing unit comprises circuitry adapted to receive at least one ICE timing signal indicative of the occurrence of at least one of an intake stroke of the ICE, a compression stroke of the ICE, a combustion stroke of the ICE, and an exhaust stroke of the ICE, and to provide the first timing signal based on the at least one ICE timing signal.

203. The fuel metering system of numbered paragraph 202, wherein the at least one ICE timing signal is provided by a sensor selected from a camshaft position sensor, a crankshaft position sensor, and an engine output shaft position sensor.

204. The fuel metering system of numbered paragraph 201, wherein the fuel metering element (FME) comprises at least one of a valve and a pump.

205. The fuel metering system of numbered paragraph 201, further comprising:
a power determination unit for determining at least one of a power output and a change in power output of the ICE for a plurality of engine combustion cycles at each of a plurality of AFR values; and
an AFR fiducial determination unit for determining at least one of a maximum-power AFR fiducial value and a maximum fuel-efficiency fiducial value based on the determined at least one of a power output and a change in power output at each of the plurality of AFR values, wherein the AFR fiducial determination unit causes the FME controller to operate the ICE for the plurality of engine combustion cycles at each of the plurality of AFR values.

206. The fuel metering system of numbered paragraph 205, wherein the ICE comprises a speed controller to adjust a throttle to maintain the ICE at a constant rotational speed in response to changes in load and power output, the fuel metering system further comprising:
an air induction determination unit (AIDU) to determine an at least one of an amount of air and an amount of oxygen inducted into the at least a first combustion chamber of the ICE for each intake stroke.

207. The fuel metering system of numbered paragraph 205, wherein the desired AFR is determined by one of interpolation and extrapolation from the at least one of a maximum-power AFR fiducial value and a maximum fuel-efficiency fiducial value.

208. The fuel metering system of numbered paragraph 201, wherein the fuel injection timing unit comprises:
at least one positioning element on a moving part of the engine comprising one of a cam and a magnet; and
a positioning element sensor comprising one of a mechanical contact element and a magnetic field sensor for sensing each time the at least one positioning element passes the sensor.

209. The fuel metering system of numbered paragraph 201, wherein the fuel injection timing unit is adapted to determine a plurality of timepoints, wherein at least one timepoint of the plurality of timepoints is indicative of the occurrence of an intake stroke for each cylinder in the ICE.

210. The fuel metering system of numbered paragraph 201, wherein the first timing signal is indicative of the start of an intake stroke.

211. The fuel metering system of numbered paragraph 201, wherein the fuel injection timing unit is adapted to provide a plurality of timepoints during the occurrence of the intake stroke.

212. The fuel metering system of numbered paragraph 201, further comprising:
power generator circuitry adapted to harvest power from at least one moving component of the ICE, wherein the power generator circuitry provides power to at least one of the fuel injection timing unit, the FME, and the FME controller.

213. The fuel metering system of numbered paragraph 212, wherein the FME comprises a pump comprising:
a pump inlet coupled to a fuel source;
a pump outlet coupled to a delivery conduit having a distal end at the air-fuel mixing location;
a fuel metering chamber having a predetermined volume;
an actuating element movable between a first position associated with a minimum volume in the fuel metering chamber and a second position associated with a maximum volume in the fuel metering chamber, the difference between the minimum and maximum volumes associated with the predetermined full stroke volume for metering fuel into an air-fuel mixing location in the induction conduit; and
a coil coupled to said power generator circuitry, the actuating element, and the FME controller;
wherein the coil and said power generator circuitry are sized to cause the FME to deliver a fraction of a full stroke volume providing a rich fuel mixture during a startup condition of the ICE when the FME controller is not operating to control the delivery of fuel to the air-fuel mixing location and to control the stroke volume of the FME.

214. The fuel metering system of numbered paragraph 213, further comprising switching circuitry to ensure that during non-startup conditions, the FME controller controls the delivery of fuel to the fuel-air mixing location and the stroke volume of the FME.

215. The fuel metering system of numbered paragraph 213, further comprising:
a fuel supply conduit having a first end coupled to a fuel source and a second end coupled to the pump inlet;
wherein the fuel metering system comprises a sealed system having no opening to the atmosphere from the proximal end of the fuel supply conduit to the pump outlet.

216. The fuel metering system of numbered paragraph 215, wherein the fuel metering system comprises a sealed system having no opening to the atmosphere from the proximal end of the fuel supply conduit to the air-fuel mixing location.

217. The fuel metering system of numbered paragraph 201, wherein the fuel injection timing unit and the FME controller comprise a single processor.

218. The fuel metering system of numbered paragraph 201, further comprising:
an air induction determination unit (AIDU) adapted to determine at least one of an amount of air and an amount of oxygen inducted into the at least a first combustion chamber during at least a plurality of intake strokes of the ICE, the AIDU comprising
a pressure sensor to sense one of absolute and differential pressure associated with air inducted into the cylinder during the at least a plurality of intake strokes, and to provide a pressure signal indicative of the sensed one of absolute and differential pressure; and
an induction change in pressure integration (IdPI) unit adapted to determine one of absolute and differential pressure a plurality of times during the at least a plurality of intake strokes based on the pressure signal, and to determine the amount of air inducted into the cylinder based on integrating the pressures determined during the at least a plurality of intake strokes.

219. The fuel metering system of numbered paragraph 218, wherein the FME controller determines the one of a full stroke volume of fuel and a fraction of a full stroke volume of fuel based on the amount of air inducted into the at least a first combustion chamber during the at least a first intake stroke determined by the IdPI unit.

220. The fuel metering system of numbered paragraph 213, wherein the fuel system further comprises:
a fuel supply conduit having a first end coupled to a fuel source and a second end coupled to the pump inlet;
wherein the fuel metering system has no flow restriction orifice from the first end of the fuel supply conduit to the air-fuel mixing location.

301. A fuel metering system for an internal combustion engine (ICE) comprising:
an air induction determination unit (AIDU) adapted to determine at least one of an amount of air and an amount of oxygen inducted into a cylinder during a first intake stroke of the ICE, the AIDU comprising:
a pressure sensor to sense one of absolute pressure and differential pressure associated with air inducted into the cylinder during the first intake stroke, and to provide a pressure signal indicative of the one of absolute pressure and differential pressure during the first intake stroke; and
an induction change in pressure integration (IdPI) unit adapted to determine said one of absolute pressure and differential pressure a plurality of times during the first intake stroke based on the pressure signal, and to determine the amount of air inducted into the cylinder based on integrating the plurality of determinations during the first intake stroke;
a fuel metering element (FME) for metering fuel into an air-fuel mixing location in the ICE; and
a FME controller adapted to deliver fuel to the cylinder during the occurrence of a second intake stroke, and to control the amount of fuel delivered to the cylinder during the second intake stroke based on the determined amount of air inducted into the cylinder during the first intake stroke, to achieve a desired AFR.

302. The fuel metering system of numbered paragraph 301, wherein the fuel metering element (FME) comprises a predetermined full stroke volume for metering fuel into the air-fuel mixing location, wherein the predetermined full stroke volume is a volume of fuel creating a rich, combustible fuel mixture in the combustion chamber of the ICE, and wherein the FME controller is adapted to control the stroke volume of the FME to deliver one of a full stroke volume of fuel and a fraction of a full stroke volume of fuel to achieve the desired AFR.

303. The fuel metering system of numbered paragraph 301, further comprising a fuel injection timing unit adapted to determine at least a first timepoint indicative of the occurrence of at least one of the first intake stroke and the second intake stroke.

304. The fuel metering system of numbered paragraph 303, wherein the fuel injection timing unit determines the at least a first timepoint by receiving a timing signal from at least one ICE sensor, the timing signal indicative of the occurrence of at least one of an intake stroke, a compression stroke, a combustion stroke, and an exhaust stroke, and wherein the FME controller is adapted to deliver fuel to the cylinder during the occurrence of the second intake stroke based on the timing signal.

401. A fuel metering system for an internal combustion engine (ICE), the ICE characterized by an intake stroke and a combustion stroke and having an induction conduit with a proximal end fluid coupled to an oxygen source and a distal end coupled to at least one induction port of a combustion chamber, and a throttle operable between a first position providing a minimum amount of air to a combustion chamber and a second position providing a maximum amount of the air to the combustion chamber, the fuel metering system comprising:
- an air induction unit adapted to determine at least one of an amount of air and an amount of oxygen inducted into the combustion chamber through the induction conduit during at least a first intake stroke of the ICE, and to provide an air induction signal indicative of the at least one of an amount of air and an amount of oxygen inducted into the combustion chamber during the at least a first intake stroke;
- a fuel metering pump for metering fuel into an air-fuel mixing location in the induction conduit during a second intake stroke of the ICE and comprising:
  - a pump inlet coupled to a fuel source;
  - a pump outlet coupled to a fuel delivery conduit having a distal end at the air-fuel mixing location;
  - a fuel metering chamber having a predetermined volume;
  - an actuating element movable between a first position associated with a minimum volume in the fuel metering chamber, a second position associated with a maximum volume in the fuel metering chamber, and a third position between the first and second positions and associated with an intermediate volume in the fuel metering chamber, wherein the difference between the minimum and maximum volumes is associated with a predetermined full stroke volume for metering fuel into the air-fuel mixing location that comprises a volume of fuel sufficient to provide a rich, combustible fuel mixture in the combustion chamber of the ICE during startup operation, and the difference between the minimum and intermediate volumes is associated with a fraction of the full stroke volume; and
- a fuel metering pump controller adapted to cause the fuel metering pump to deliver fuel to the fuel-air mixing location during the second intake stroke, wherein the fuel metering pump controller controls the stroke volume of the fuel metering pump based on the air induction signal indicative of the at least one of an amount of air and an amount of oxygen inducted into the combustion chamber during the at least a first intake stroke to deliver one of a full stroke volume of fuel and a desired fraction of the full stroke volume of fuel to achieve a desired AFR during the second intake stroke.

402. The fuel metering system of numbered paragraph 401, wherein the induction of the air and fuel in the induction conduit during the second intake stroke occurs at no more than 2 psi above atmospheric pressure.

403. The fuel metering system of numbered paragraph 401 further comprising:
a fuel metering timing unit adapted to determine at least a first timepoint during the second intake stroke, wherein the fuel metering pump controller initiates delivery of fuel from the fuel metering pump to the fuel-air mixing locating during the second intake stroke at the first timepoint.

404. The fuel metering system of numbered paragraph 403, wherein the fuel metering timing unit determines at least the first timepoint during the second intake stroke based on the timing of the air induction signal.

405. The fuel metering system of numbered paragraph 403, wherein the fuel metering timing unit determines at least the first timepoint during the second intake stroke based on a signal from the ICE indicative of the occurrence of at least one of an intake stroke, a compression stroke, a combustion stroke, and an exhaust stroke.

406. The fuel metering system of numbered paragraph 403, wherein the fuel metering timing unit determines at least the first timepoint during the second intake stroke based on a signal from at least one ICE sensor selected from a camshaft position sensor, a crankshaft position sensor, and an engine output shaft position sensor.

407. The fuel metering system of numbered paragraph 401, wherein the actuating element comprises at least one of a piston and a diaphragm, and wherein the actuating element is operable by a user to manually cause delivery of fuel to the air-fuel mixing location.

408. The fuel metering system of numbered paragraph 401, wherein the fuel metering pump further comprises:
a coil coupled to an electrical energy source, wherein the coil when energized causes the actuating element to move between the first position and one of the second position and the third position based on the electrical energy applied to the coil;
wherein the fuel metering pump controller is adapted to terminate the application of electrical energy to the coil to control the movement of the actuating element to a desired third position to cause the fuel pump to deliver a desired fraction of a full stroke volume to the air-fuel mixing location to achieve a desired AFR.

409. The fuel metering system of numbered paragraph 408, further comprising:
a fuel supply conduit having a proximal end coupled to a fuel source and a second end coupled to the pump inlet;
wherein the fuel metering system comprises a sealed system having no opening to the atmosphere from the proximal end of the fuel supply conduit to the pump outlet.

410. The fuel metering system of numbered paragraph 408, wherein the fuel metering system comprises a sealed system having no opening to the atmosphere from the proximal end of the fuel supply conduit to the fuel air-mixing location.

411. The fuel metering system of numbered paragraph 408, wherein the fuel metering pump further comprises a biasing element biasing the actuating element to the first position and preventing fuel delivery to the air-fuel mixing locating when the ICE is operating at the idle throttle position or not running.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

All of the apparatus and methods disclosed and claimed herein may be made and executed without undue experimentation in light of the present disclosure. While the invention has been described in terms of particular embodiments, it will be apparent to those of skill in the art that variations may be applied to the apparatus and methods described herein without departing from the concept, spirit and scope of the invention, which are limited only by the claims.

What is claimed is:

1. A fuel metering system for an internal combustion engine (ICE), the ICE having a maximum power output, at least a first combustion chamber associated with at least a first cylinder, and at least an intake stroke and a combustion stroke, the fuel metering system comprising:
   a fuel injection timing unit comprising circuitry for providing a first timing signal indicative of the occurrence of at least one timepoint during at least one of an intake stroke, a compression stroke, a combustion stroke, and an exhaust stroke of the ICE;
   a fuel metering element (FME) actuated by a first switch, the FME having a predetermined full stroke volume for metering fuel into an air-fuel mixing location in the ICE, wherein the predetermined full stroke volume is a volume of fuel creating one of a rich, combustible fuel mixture and a stoichiometric fuel mixture in the at least a first combustion chamber of the ICE at the maximum power output; and
   a FME controller operatively coupled to the first switch and the FME to control the delivery of fuel to the air-fuel mixing location during actuation of the FME by providing an electrical control signal to the first switch in response to the first timing signal, wherein the electrical control signal causes the FME to deliver one of a full stroke volume of fuel and a fraction of a full stroke volume of fuel to achieve a desired air-to-fuel ratio (AFR), wherein the FME controller causes the FME to deliver a fraction of a full stroke volume by actuating the first switch at a timepoint during actuation of the FME to terminate the actuation of the FME.

2. The fuel metering system of claim 1, wherein the fuel injection timing unit comprises circuitry adapted to receive at least one ICE timing signal indicative of the occurrence of at least one of an intake stroke of the ICE, a compression stroke of the ICE, a combustion stroke of the ICE, and an exhaust stroke of the ICE, and to provide the first timing signal based on the at least one ICE timing signal.

3. The fuel metering system of claim 2, wherein the at least one ICE timing signal is provided by a sensor selected from a camshaft position sensor, a crankshaft position sensor, and an engine output shaft position sensor.

4. The fuel metering system of claim 1, wherein the fuel metering element (FME) comprises at least one of a valve and a pump.

5. The fuel metering system of claim 1, further comprising:
   a power determination unit comprising circuitry for determining at least one of a power output and a change in power output of the ICE for a plurality of engine combustion cycles at each of a plurality of AFR values; and
   an AFR fiducial determination unit comprising circuitry for determining at least one of a maximum-power AFR fiducial value and a maximum fuel-efficiency fiducial value based on the determined at least one of a power output and a change in power output at each of the plurality of AFR values, wherein the AFR fiducial determination unit circuitry causes the FME controller to operate the ICE for the plurality of engine combustion cycles at each of the plurality of AFR values.

6. The fuel metering system of claim 5, wherein the ICE comprises a speed controller to adjust a throttle to maintain the ICE at a constant rotational speed in response to changes in load and power output, the fuel metering system further comprising:
   an air induction determination unit (AIDU) comprising circuitry to determine an at least one of an amount of air and an amount of oxygen inducted into the at least a first combustion chamber of the ICE for each intake stroke.

7. The fuel metering system of claim 5, wherein the desired AFR is determined by one of interpolation and extrapolation from the at least one of a maximum-power AFR fiducial value and a maximum fuel-efficiency fiducial value.

8. The fuel metering system of claim 1, wherein the fuel injection timing unit comprises:
   at least one positioning element on a moving part of the engine comprising one of a cam and a magnet; and
   a positioning element sensor comprising one of a mechanical contact element and a magnetic field sensor for sensing each time the at least one positioning element passes the sensor.

9. The fuel metering system of claim 1, wherein the fuel injection timing unit circuitry is adapted to determine a plurality of timepoints, wherein at least one timepoint of the plurality of timepoints is indicative of the occurrence of an intake stroke for each cylinder in the ICE.

10. The fuel metering system of claim 1, wherein the first timing signal is indicative of the start of an intake stroke.

11. The fuel metering system of claim 1, wherein the fuel injection timing unit circuitry is adapted to provide a plurality of timepoints during the occurrence of the intake stroke.

12. The fuel metering system of claim 1, further comprising:
   power generator circuitry adapted to harvest power from at least one moving component of the ICE, wherein the power generator circuitry provides power to at least one of the fuel injection timing unit, the FME, and the FME controller.

13. The fuel metering system of claim 12, wherein the FME comprises a pump comprising:
   a pump inlet coupled to a fuel source;
   a pump outlet coupled to a delivery conduit having a distal end at the air-fuel mixing location;
   a fuel metering chamber having a predetermined volume;
   an actuating element movable between a first position associated with a minimum volume in the fuel metering chamber and a second position associated with a maximum volume in the fuel metering chamber, the difference between the minimum and maximum volumes associated with the predetermined full stroke volume for metering fuel into an air-fuel mixing location in the induction conduit; and
   a coil coupled to said power generator circuitry, the actuating element, and the FME controller;
wherein the coil and said power generator circuitry are sized to cause the FME to deliver a fraction of a full stroke volume providing a rich fuel mixture during a startup condition of the ICE when the FME controller is not operating to control the delivery of fuel to the air-fuel mixing location and to control the stroke volume of the FME.

14. The fuel metering system of claim 13, further comprising switching circuitry to ensure that during non-startup conditions, the FME controller controls the delivery of fuel to the fuel-air mixing location and the stroke volume of the FME.

15. The fuel metering system of claim 13, further comprising:
a fuel supply conduit having a first end coupled to a fuel source and a second end coupled to the pump inlet;
wherein the fuel metering system comprises a sealed system having no opening to the atmosphere from the proximal end of the fuel supply conduit to the pump outlet.

16. The fuel metering system of claim 15, wherein the fuel metering system comprises a sealed system having no opening to the atmosphere from the proximal end of the fuel supply conduit to the air-fuel mixing location.

17. The fuel metering system of claim 1, wherein the fuel injection timing unit and the FME controller comprise a single processor.

18. The fuel metering system of claim 1, further comprising:
an air induction determination unit (AIDU) comprising circuitry adapted to determine at least one of an amount of air and an amount of oxygen inducted into the at least a first combustion chamber during at least a plurality of intake strokes of the ICE, the AIDU comprising
a pressure sensor to sense one of absolute and differential pressure associated with air inducted into the cylinder during the at least a plurality of intake strokes, and to provide a pressure signal indicative of the sensed one of absolute and differential pressure; and
an induction change in pressure integration (IdPI) unit adapted to determine one of absolute and differential pressure a plurality of times during the at least a plurality of intake strokes based on the pressure signal, and to determine the amount of air inducted into the cylinder based on integrating the pressures determined during the at least a plurality of intake strokes.

19. The fuel metering system of claim 18, wherein the FME controller determines the one of a full stroke volume of fuel and a fraction of a full stroke volume of fuel based on the amount of air inducted into the at least a first combustion chamber during the at least a first intake stroke determined by the IdPI unit.

20. The fuel metering system of claim 13, wherein the fuel system further comprises:
a fuel supply conduit having a first end coupled to a fuel source and a second end coupled to the pump inlet;
wherein the fuel metering system has no flow restriction orifice from the first end of the fuel supply conduit to the air-fuel mixing location.

21. A fuel metering system for an internal combustion engine (ICE), the ICE having a maximum power output, at least a first combustion chamber associated with at least a first cylinder, and one or more engine strokes comprising an engine cycle, the fuel metering system comprising:
a fuel injection timing unit comprising circuitry for providing a first timing signal indicative of the occurrence of at least one timepoint during said one or more engine strokes;
a fuel metering element (FME) having a predetermined full stroke volume for metering fuel into an air-fuel mixing location in the ICE during at least one of the one or more engine strokes, wherein the predetermined full stroke volume is a volume of fuel creating one of a rich, combustible fuel mixture and a stoichiometric fuel mixture in the at least a first combustion chamber of the ICE at maximum ICE power output;
a FME controller operatively coupled to a first switch for controlling delivery of fuel to the air-fuel mixing location during actuation of the FME by providing an electrical control signal to the first switch in response to the first timing signal, wherein the electrical control signal causes the FME to deliver one of a full stroke volume of fuel and a fraction of a full stroke volume of fuel to achieve a desired air-to-fuel ratio (AFR), wherein the FME controller causes the FME to deliver a fraction of a full stroke volume by controlling the first switch at a timepoint during actuation of the FME to terminate actuation of the FME by limiting energy applied to the FME; and
power generator circuitry adapted to harvest power from at least one moving component of the ICE, wherein the power generator circuitry provides power to at least one of the fuel injection timing unit, the FME, and the FME controller.

22. The fuel metering system of claim 21, wherein the power generator circuitry provides a first electrical signal that, in the absence of the electrical control signal, causes the FME to deliver a full stroke volume of fuel, and wherein the FME provides an electrical control signal to regulate the first electrical signal to cause the FME to deliver a fraction of a full stroke volume of fuel.

23. The fuel metering system of claim 21, wherein the FME controller regulates the first electrical signal by shunting a portion of the first electrical signal to reduce the stroke volume of the FME.

24. A fuel metering system for an internal combustion engine (ICE), the ICE having a maximum power output, at least a first combustion chamber associated with at least a first cylinder, and one or more engine strokes comprising an engine cycle, the fuel metering system comprising:
a fuel injection timing unit comprising circuitry for providing a first timing signal indicative of the occurrence of at least one timepoint during said one or more engine strokes;
a fuel metering element (FME) having a predetermined full stroke volume for metering fuel into an air-fuel mixing location in the ICE when actuated during at least one of the one or more engine strokes, wherein the predetermined full stroke volume is a volume of fuel creating a rich, combustible fuel mixture in the at least a first combustion chamber of the ICE at maximum ICE power output;
a passive element causing the FME to initiate an actuation event for delivery of a full stroke volume of fuel based on one of the first timing signal, engine rotation, or the occurrence of one of said one or more engine strokes; and
a FME controller operatively coupled to a first switch to interrupt an actuation event to cause the FME to provide less than a full stroke volume of fuel to the air-fuel mixing location by controlling the first switch at a timepoint during the actuation event to provide one of an open circuit or a shunting of energy to limit fuel metered by the FME to the air-fuel mixing location.

\* \* \* \* \*